US005138562A

United States Patent [19]

[11] Patent Number: 5,138,562

[45] Date of Patent: Aug. 11, 1992

Shaw et al.

[54] ENVIRONMENTAL PROTECTION SYSTEM USEFUL FOR THE FIRE DETECTION AND SUPPRESSION

[75] Inventors: Bon F. Shaw, Winter Park; Gary M. Bond, Orlando; Randy R. Fields, Winter Park, all of Fla.

[73] Assignee: Fike Corporation, Blue Springs, Mo.

[21] Appl. No.: 842,776

[22] Filed: Mar. 2, 1992

Related U.S. Application Data

[60] Continuation of Ser. No. 569,189, Aug. 17, 1990, abandoned, which is a division of Ser. No. 181,644, Apr. 14, 1988, Pat. No. 4,977,527.

[51] Int. Cl.[5] .......................... G06F 15/20; G08B 19/00

[52] U.S. Cl. .......................... 364/550; 340/501; 364/481; 364/571.01; 364/571.06

[58] Field of Search .......................... 340/501, 505; 364/550, 364/483, 571.01, 571.02, 571.03, 571.05, 571.06, 481

[56] References Cited

U.S. PATENT DOCUMENTS

| | | | |
|---|---|---|---|
| 3,665,461 | 5/1972 | Gnägi et al. | 340/628 |
| 4,266,220 | 5/1981 | Malinowski | 340/630 |
| 4,507,652 | 3/1985 | Vogt et al. | 340/501 |
| 4,514,720 | 4/1985 | Oberstein et al. | 340/511 |
| 4,543,565 | 9/1985 | Oberstein et al. | 340/506 |
| 4,555,695 | 11/1985 | Machida et al. | 340/538 |
| 4,887,291 | 12/1989 | Stillwell | 340/506 X |
| 4,930,095 | 5/1990 | Yuchi et al. | 364/571.01 |

*Primary Examiner*—Kevin J. Teska

*Attorney, Agent, or Firm*—Hovey, Williams, Timmons & Collins

[57] ABSTRACT

An environmental detection system particularly useful for fire detection and suppression is provided which ensures high reliability in operation and high reliability in preventing false operation. The preferred system includes a microprocessor-based, software-governed, control panel connected to one or more detector loops. Each loop includes a plurality of parallel-coupled, addressable detectors which send analog signals to the control panel representative of an environmental parameter such as smoke obscuration along with reference and identification signals. The preferred system provides automatic calibration and test of the detectors, automatic testing under load of the backup batteries, flexibility in defining the protective scheme, and storage of history information concerning system alarms and troubles. The preferred system also verifies alarm conditions before actuating an alarm or discharging a fire suppressant.

9 Claims, 22 Drawing Sheets

I/O MODULE

STARTUP / RESET

MAIN LOOP

CALIBRATE

READ DETECTORS

DETECTOR CHECK

DETECTOR ANALYSIS

ALARM ANALYSIS

ENVIRONMENTAL PROTECTION SYSTEM USEFUL FOR THE FIRE DETECTION AND SUPPRESSION

This application is a continuation of application Ser. No. 569,189, filed Aug. 17, 1990, now abandoned.

This application is also a division of application Ser. No. 181,644, filed on Apr. 14, 1988, now U.S. Pat. No. 4,977,527.

BACKGROUND OF THE INVENTION

1. Field of the Invention

The present invention concerns an environmental detection system particularly useful for fire detection and suppression which ensures high reliability in operation and high reliability in preventing false operation. More particularly, this invention is concerned with a microprocessor-based, software-driven control panel connected to one or more detector loops each of which includes a plurality of addressable detectors which send analog signals to the control panel representative of an environmental parameter such as smoke obscuration along with reference and identification signals. The control panel processes information received from the detectors to determine whether an alarm condition exists as defined by the system configuration defined in memory. The system provides automatic calibration and testing of the detectors, automatic testing under load of the backup batteries, flexibility in defining the protection scheme, and storage of history information concerning the system alarms and troubles. The preferred system also verifies alarm conditions before actuating an alarm or discharging a fire suppressant.

2. Background of the Prior Art

Typical prior art fire protection systems use fire detectors configured in a so-called detector loop which is coupled to a control panel. The detector loop comprises a pair of wires to which the detectors are electrically coupled in parallel. The wires are connected to the control panel which supplies operating power to the detector loop.

Fire detectors may be designed to sense smoke obscuration, ionization, temperature, or the like, all of which may be indicative of a fire. A typical detector is designed to operate in an on/off mode by changing from an inactive state to an active state whenever the environmental condition which the detector is designed to monitor exceeds a predetermined threshold. In the active state, the internal resistance of the detector is lowered thereby increasing the current flow therethrough and thereby increasing the current flow through the detector loop. When the current flow level in the detector loop exceeds a predetermined threshold, the control panel activates an alarm or discharges a fire suppressant such as water or halon, a fire suppressant gas.

This type of fire protection system presents a number of problems. For example, the sensitivity of each detector, that is, the threshold level which the detector changes from its inactive state to its active state, must be manually set by adjusting each individual detector. This task can become unwieldy and labor intensive in the typical system using hundreds of detectors. Additionally, the requirement to manually adjust the sensivity of each detector effectively prevents sensivity adjustment as a function of the time of day. For example, it may be desirable to have a low sensitivity in a kitchen area during the day when the kitchen is in use and producing some smoke and heat, and a high sensitivity, that is a low threshold level, at night when the kitchen is not in use.

Typical prior art systems also can be expensive to install if a so-called cross-zone protection scheme is to be used, for examle. In the cross-zone scheme, a given area, such as a room, is defined as having two zones, each zone with its own detectors. The cross-zone scheme improves the reliability of the system by requiring that a detector from each zone be active in order to actuate the system which avoids a false alarm if a single detector becomes defective and thereby erroneously indicates an alarm condition. The cross-zone scheme also prevents a false alarm in the event of a short circuit in the wires of a single detector loop.

The cross-zone scheme, while improving the reliability of the system, is also expensive to install in that separate wires must be run for each detector loop. This can be particularly expensive if the area to be protected under the cross-zone scheme is a significant distance away from the control panel.

More recent prior art protection systems overcome some of the disadvantages of the older systems by providing a microprocessor-based control panel and so-called "smart" detectors. These detectors produce signals representative of the magnitude of the parameter being sensed, such as smoke obscuration, rather than just active-inactive signals. The control panel, typically under software control, analyzes the information sent from the detectors to determine whether an alarm condition exists. Additionally, the fire protection scheme can be defined in software which eliminates the need for separate detector loops and separate wiring for the various zones. That is to say, all of the detectors in a particular area can be part of a single detector loop with the zones defined in software for the cross-zone scheme, for example.

Even the more advanced prior art fire protection systems, however, present certain problems and disadvantages. For example, a typical detector experiences signal drift over time which may be due to dust accumulation on the components of the detector, the age of the components, and the ambient temperature surrounding the detector. Because of the signal drift, the detector can send incorrect information as to the magnitude of the parameter which the detector is sensing. In such circumstances, separate detectors exposed to the same environmental condition parameter may indicate different magnitudes. This in turn may cause a false alarm or even worse, fail to actuate an alarm when an alarm condition exists. To overcome this problem, manual calibration and testing of the detectors from time to time are required to maintain the reliability of the system. Accordingly, the prior art points out the need for a system which automatically calibrates and tests the detectors from time to time.

Typical prior art fire protection systems use conventionally available A.C. power to operate the system and include backup batteries to maintain the system in operation in the event of power failure. The capacity of the batteries decreases with age, however, which requires replacement on a timely basis. Determination of battery capacity requires manual testing by removing the batteries and placing them under load. This requires a conscientious and well developed maintenance program to ensure that these tests are periodically conducted. Accordingly, the prior art points out the need for a system which automatically and periodically tests the backup batteries under load to determine whether their capacity is sufficient to ensure reliable operation of the system in the event of power failure Finally, even the more advanced fire protection systems using microprocessors are subject to false alarms in the event the microprocessor fails to properly execute its operating program. That is to say, a voltage spike, induced currents caused by lightning, and so forth may cause improper execution of the operating program which may produce false actuation of a fire suppressant or alarm. Accordingly, the prior art points out the need for a system which verifies proper operation of a microprocessor-based control panel before an alarm output is produced.

SUMMARY OF THE INVENTION

The problems outlined above are solved by the environmental detection system of the present invention. That is to say, the system hereof automatically and periodically calibrates and tests the system's detectors, automatically records events associated with the operation of the system and the detectors in order to provide an operating history, automatically verifies an alarm output, and automatically and periodically tests the backup batteries under load.

Broadly speaking, the preferred system includes a microprocessor-based, software-driven control panel operably coupled with at least one detector loop having a plurality of detectors coupled with the control panel.

Preferably, the detectors are configured in a detector "loop" and receive operating voltage from the control panel on a two-wire pair interconnecting them therewith and are addressable by means of voltage pulses superimposed on the loop by the control panel. In response to the correct address, that is, the correct number of voltage pulses corresponding to a detector's address, a polled detector provides a sequential analog current signals corresponding to various "states". These states convey different types of information to the control panel. For example, these states includes a reference current level, a current level representative of the environmental condition parameter which the detector is sensing, and a current level representative of the type of detector, e.g., a smoke obscuration detector. In addition, the detectors are operable for providing a reference current level representative of a predetermined magnitude of the parameter being sensed such as 4.5% per meter obscuration.

The control panel includes various memory devices for storing information and for storing the operating program of the microprocessor. Specifically, the preferred control panel, by means of hardware and software, automatically and periodically calibrates each detector by calculating an alarm threshold as a function of the normal reference current, the test reference current representative of 4.5% per meter smoke obscuration, and a sensitivity value stored in memory.

The control panel also includes means for determining whether the various signals received from the detectors fall beyond predetermined limits such being indicative of an anomaly or defect associated with a particular detector. If such occurs, a trouble signal is generated indicating which detector is malfunctioning. The system also prevents this detector from initiating an alarm condition.

The control panel, also by means of its hardware and software, stores an operating history including for example, the date and time at which any detector became defective and at which any detector indicated an alarm condition. The operating history is useful for tracing the spread of a fire and its subsequent suppression.

The preferred system also includes backup batteries for operating the system in the event of AC power failure. The control panel automatically and periodically places the batteries under load and measures their resulting output voltage in order to determine whether the batteries have sufficient capacity to operate for an extended period of time in the event of A.C. power failure.

Finally, the system verifies an alarm condition before producing an alarm output for actuating an audible alarm or a fire suppressant such as water or halon. Whenever a particular detector indicates an alarm condition, the test data from the previous test thereof are examined. If the test data are outside predetermined limits, the system will not allow this detector to produce an alarm condition. Additionally, an output circuit is provided which requires that two alarm commands be produced before an output signal is sent to an external output device. The time interval between alarm commands is sufficient to allow -a so-called "watchdog" device to reset the microprocessor in the event the microprocessor is not properly executing its program. If such an event occurs and the microprocessor sends a alarm command signal during its erroneous operation, sufficient time is provided for the watchdog timer to reset the microprocessor before it sends a second alarm command signal thus preventing a false alarm or false trip of the system.

DETAILED DESCRIPTION OF THE PREFERRED EMBODIMENT

I. Hardware

Figure 1:
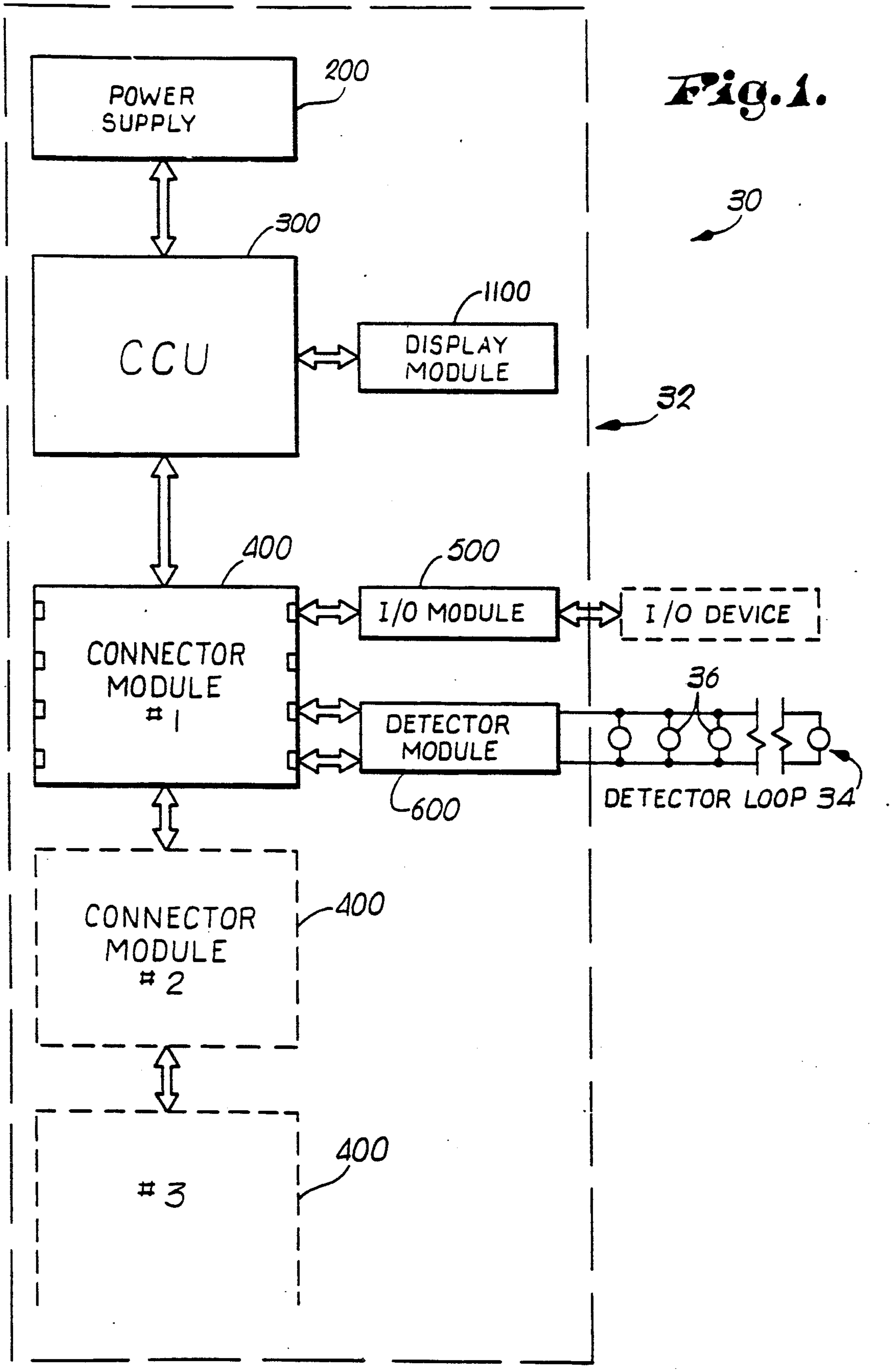
FIG. 1 is a schematic representation of the preferred system illustrating the interrelationship of the control panel components and a detector loop.

Referring now to the drawing figures, FIG. 1 illustrates the preferred embodiment of system 30 including control panel 32 and detector loop 34 including a plurality of detectors 36.

Figure 11:
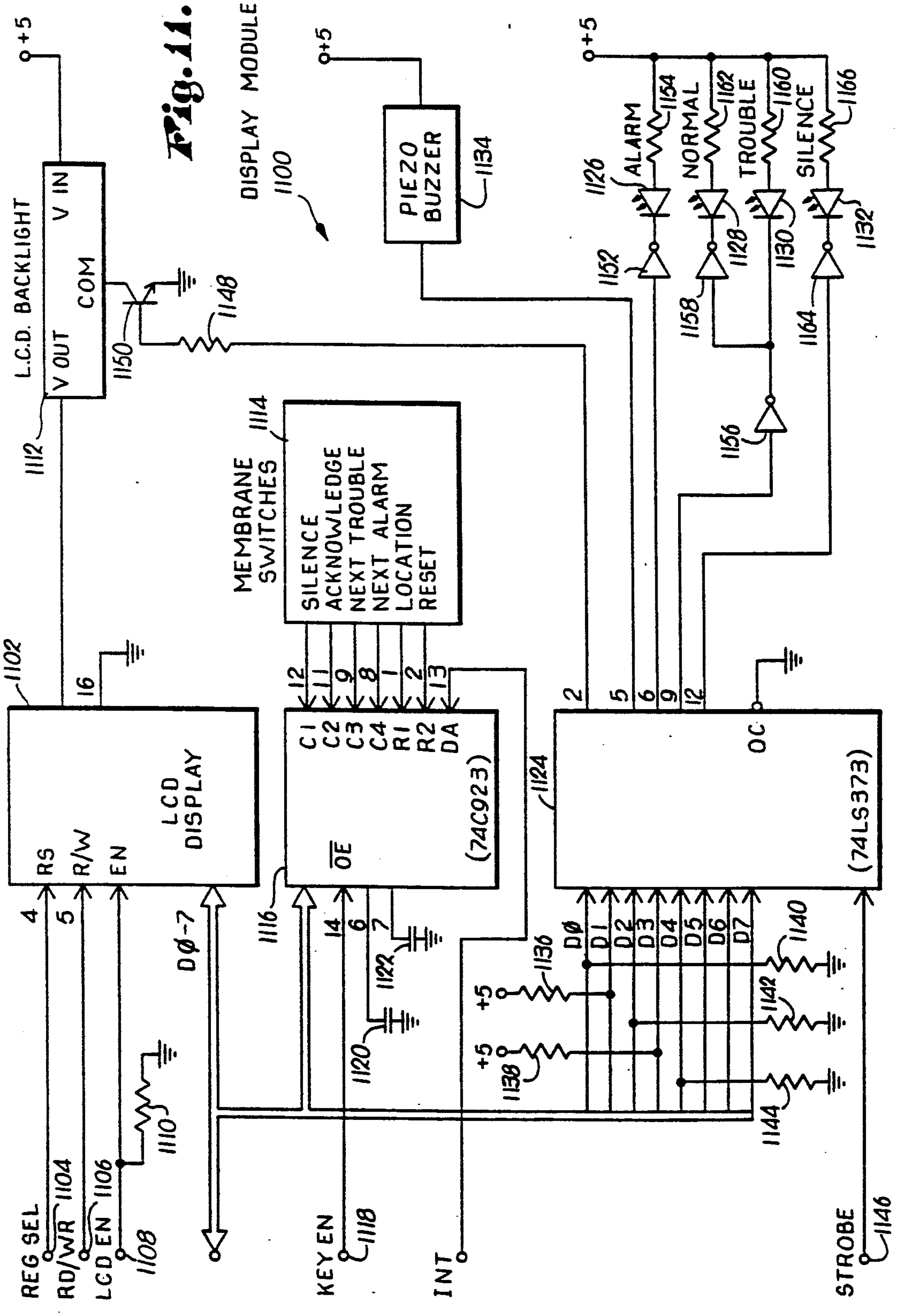
FIG. 11 is a schematic diagram of the power supply.

Control panel 32 includes power supply 200 (FIG. 2), central control unit (CCU) 300 (FIG. 3), connector module 400 (FIG. 4), input/output (I/O) module 500 (FIG. 5), detector module 600 (FIG. 6), and display module 1100 (FIG. 11). As illustrated in FIG. 1, control panel 32 can optionally include additional connector modules shown in dashed lines as a matter of design choice as will be further explained. Additionally, I/O module 500 is typically connected to external input or output devices or both as desired which will also be further explained.

Figure 2:
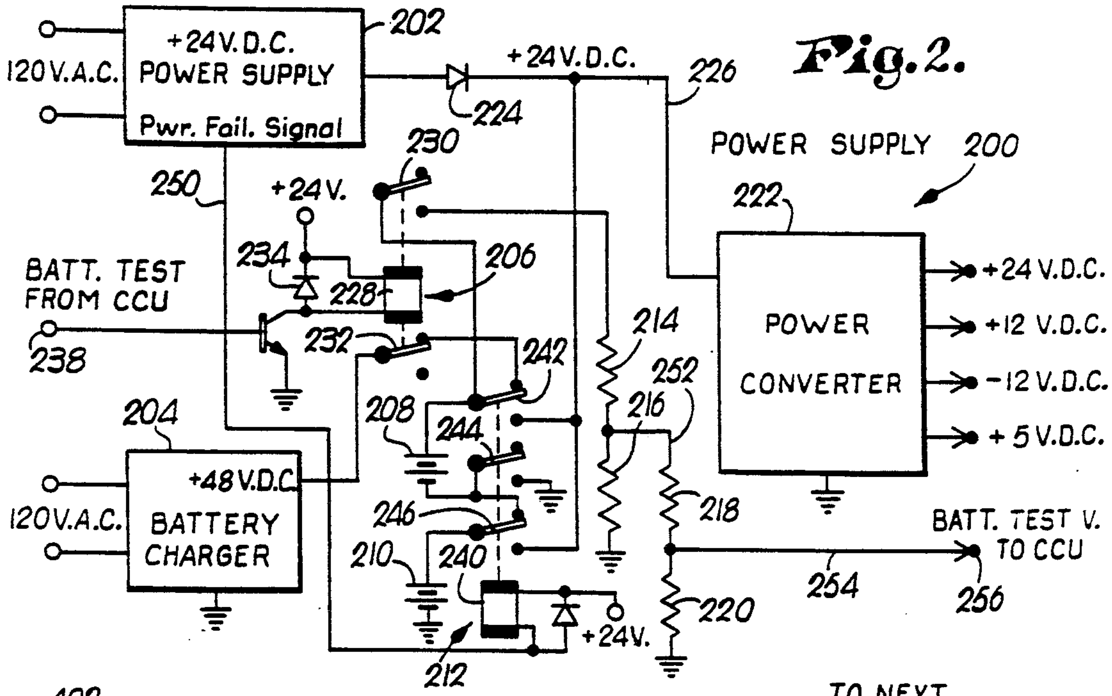
FIG. 2 is a schematic representation of the central processing unit of the system.

FIG. 2 illustrates power supply 200 which supplies operating power to the various components of system 30. Power supply 200 includes +24 V.D.C.. power supply 202, conventional battery charger 204, battery test relay 206, 24 volt batteries 208 and 210, power failure relay 212, load resistors 214 and 216 (each 25 ohm, 50 watt), test resistor 218 (51.1 K ohms), test resistor 220 (10.0 K ohms), and power converter 222.

Conventional +24 V.D.C. power supply 202 receives input from a source of 120 V.A.C. and delivers an output at +24 V.D.C. via blocking diode 224 and line 226 as input to power converter 222.

Power converter 222 provides output power to the various components of system 30 at +24, +12, −12, and +12 V.D.C. as shown. Converter 222 is conventional in nature and preferably includes a D.C./D.C. converter (type PKA-2232P, not shown), to supply power at +5 V.D.C. and also includes a pair of regulators (type LN320T-12, not shown) to respectively supply power at +12 and −12 V.D.C.

Test relay 206 includes coil 228 operable at +24 V.D.C., and contacts 230 and 232. One side of coil 228 is connected to the cathode of suppression diode 234 and +24 V.D.C. The other side of coil 228 is connected to the anode of diode 234 and to the collector of transistor 236. The emitter of transistor 236 is connected to ground as shown and the base is connected to terminal 238.

When terminal 238 receives a logic high (+5 V D.C.) signal from CCU 300, transistor 236 conducts in order to energize coil 228 and to operate contacts 230 and 232 to place batteries 208, 210 under load as will be explained further hereinbelow.

Conventional battery charger 204 receives an input from a source of 120 V.D.C. and provides an output at +48 V.D.C. to contact 232 as shown in FIG. 2.

Conventional electromechanical power failure relay 212 includes coil 240 and contacts 242, 244, and 246.

The positive side of battery 208 is connected to contact 230 of test relay 206 and also to contact 242 of power failure relay 212. The negative side of battery 208 is connected to contacts 244 and 246 of power failure relay 212 as shown. The positive terminal of battery 210 is connected to contact 246 and the negative side is connected to ground as shown.

One side of coil 240 is connected to the cathode of suppression diode 248 and to +24 V.D.C. The other side of coil 240 is connected to the anode of diode 248 and via line 250 to the power failure signal terminal of power supply 202.

Normally, batteries 208 and 210 are off line and receive charging current from battery charger 204 by way of contact 232 and contact 242 to battery 208 and also by way of contact 246 to battery 210.

In the event of power failure, power supply 202 internally couples line 250 to ground which energizes coil 240. This in turn operates contacts 242–246. When such occurs, the positive output from each battery 208, 210 is connected via contacts 242 and 246 respectively to line 226 in order to supply power to power converter 222. Contact 244 when operated by coil 240 connects the negative side of battery 208 to ground as shown.

In the event of a battery test signal from CCU 300 which energizes coil 228 as explained above, contact 232 of test relay 206 takes battery charger 204 off line, that is, disconnects it from batteries 208, 210 and in turn connects the positive side of battery 208 by way of contact 30 to one side of resistor 214. Resistors 214 and 216 are connected in series as shown and with test relay 206 actuated, place a 50 ohm load on batteries 208, 210.

Resistors 214 and 216 are interconnected by line 252 which is in turn connected to one side of resistor 218 which together with resistor 220 form another voltage divider network. Line 254 interconnects resistors 218 and 220 and additionally connects to output terminal 256. With test relay 206 actuated and batteries 208 and 210 under load, a nominal voltage of 1.96 V.D.C. is produced at terminal 256 which is read and analyzed by CCU 300 in order to determine whether the voltage on batteries 208, 210 is maintained while under load. Preferably, the battery test is conducted once a week for one hour at the end of which the battery voltage as represented by the voltage on terminal 256 is read and analyzed by CCU 300. If the battery voltage is below a predetermined limit, a trouble indication is generated. As an alternative battery test, the batteries can be placed under load until their voltage falls below a certain level with the time interval for this to occur being an indication of battery capacity.

Figure 3:
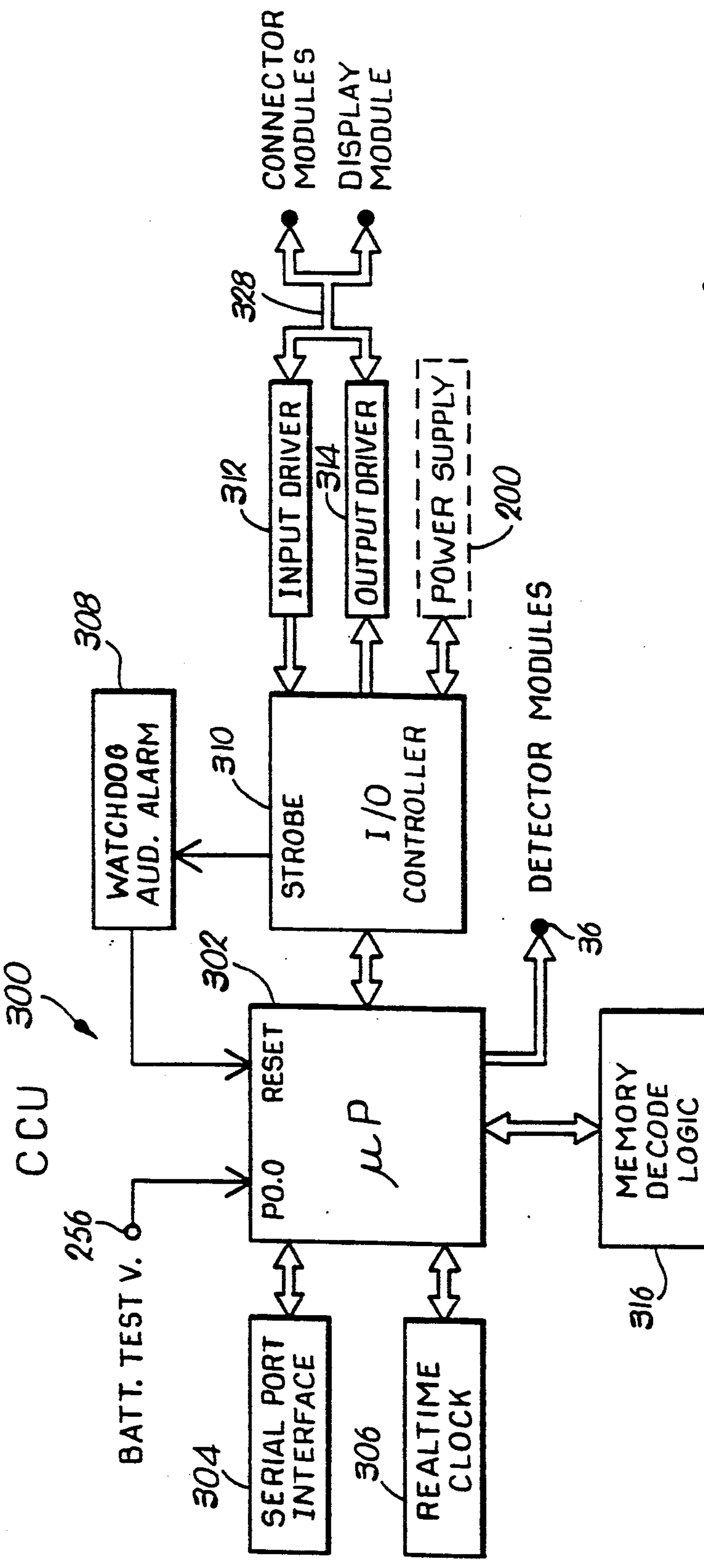
FIG. 3 is a schematic representation of a connector module also illustrating an input/output module and a detector module.

FIG. 3 illustrates central control unit 300 which includes microprocessor 302 (Intel 8097) including a conventional oscillator circuit (not shown) generating clock signals at 11.0592 megahertz. CCU 300 also includes serial port interface 304, real time clock 306, watchdog and audible alarm circuit 308, input/output (I/O) controller 310, input driver 312, output driver 314, memory decode logic circuit 316, program read only memory (ROM) 318, system random access memory (RAM) 320, non-volatile random access memory (NVRAM) 322, and nonvolatile random access memory (NVRAM) 324. Components 302-324 are conventional in nature and conventionally interconnected.

Microprocessor 302 receives the voltage input representative of the test voltage on batteries 208, 210 as discussed above in connection with power supply 200 from terminal 256 at terminal P0.0. By monitoring the voltage received thereby, microprocessor 302 through its operating program determines whether the battery test voltage is within predetermined limits. If not, microprocessor 302 stores this information in NVRAM 76 and announces and displays this condition by way of display module 1100.

Microprocessor 302 sends and receives signals via I/O controller 84 to power supply 16. One of these signals is the battery test signal initiated at terminal 238 (FIG. 2). Additionally, microcomputer 302 receives signals indicative of AC power failure, blown fuses, and the like (not shown).

Serial port interface 304 is coupled with microprocessor 302 for transfer of data to and from remote locations. For example, interface 304 can be used to remotely monitor the operation of system 30 by receiving information concerning the operating history from NVRAM 322 indicating any troubles or alarms. Additionally, interface 304 can be used to change the program or system configuration as stored in program ROM 318 or NVRAM 324 from remote location. Interface 304 can also provide information to a graphic annunciator (not shown) for illustrating the location of an alarm or trouble condition.

Real time clock 306 provides real time information to display module 1100 and to history NVRAM 322 to store the real time of a trouble or alarm event.

Watchdog and audible alarm circuit 308 is preferably included to reset microprocessor 302 in the event it improperly executes its program. As is conventional, the program includes code to periodically strobe and thus reset the watchdog before it times out and resets microprocessor 302. An audible alarm is included to sound in the event the watchdog times out.

I/O controller 310 decodes and controls the input and output functions of microprocessor 302 to write to or read from, and enable, external devices via input driver 312 and output driver 314 as well as to power supply 200. Drivers 312 and 314 are operably coupled with input/output (I/O) bus 328.

Microprocessor 302 also generates and delivers pulse voltage signals to control detector module 600 via output terminal 326.

Microprocessor 302 writes to, reads from, and enables its auxilliary memory devices 318-324 by way of conventional memory decode logic 316.

Program ROM 318 includes a capacity of 64 K bytes and stores the operating program for microprocessor 302.

System RAM 320 preferably includes 16 K bytes of memory capacity for storing data used during operation.

NVRAM 322 stores history information regarding the operation of system 30. With its preferred 16 K bytes of memory capacity, NVRAM 322 stores information concerning the past 256 events, either troubles or alarms, of system 30 with sufficient detail to display on display module 1100 the nature of events including the real time and date at which each occurred.

NVRAM 324 with 64 K bytes of preferred memory stores information concerning the configuration of system 30. More particularly, NVRAM 322 includes information concerning the definition of the fire protection zones such as cross-zone, verified zone, building protection scheme or the like. In addition, NVRAM 324 stores the sensitivity data for each detector, the type and number of detectors included in system 30, the specifications for the test limits of the detectors, and the type and location of external devices, and the number of connector and detector modules.

Figure 4:
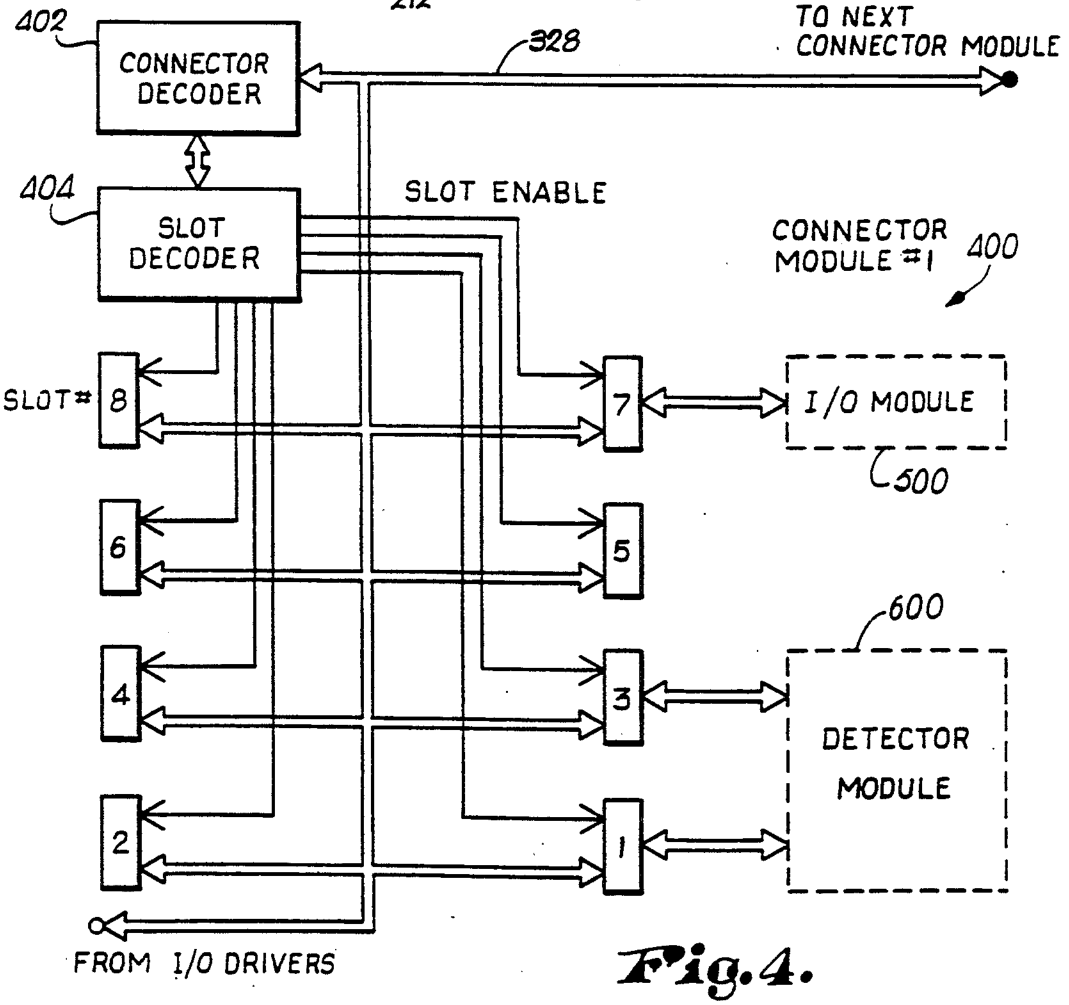
FIG. 4 is a schematic diagram of a detector module illustrating the interrelationships of the detector pulse voltage control circuit, Class A wiring control circuit, signal detector circuit, and quiescent current pulse control circuit.

FIG. 4 illustrates connector module 20 which is typical of a plurality of connector modules which may be coupled to CCU 300 by I/O bus 328. Connector module 400 provides an innerface with external devices by means of which CCU 300 can interact with those devices.

Module 400 includes connector decoder 402 operably coupled with I/O bus 328, slot decoder 106 operably coupled with decoder 402 and with connector slots 1, 2, 3, 4, 5, 6, 7, 8, as illustrated. Each slot 1-8 provides the physical connection with the external device with each designed to connect with an input/output module. For connection with detector module 600, two adjacent slots are required.

In operation, decoder 402 monitors bus 328 and when the correct address is received for the particular connector module 400, allows slot decoder 404 to enable the appropriate slots so that the external device can seize bus 328 for reading or writing information.

Figure 5:
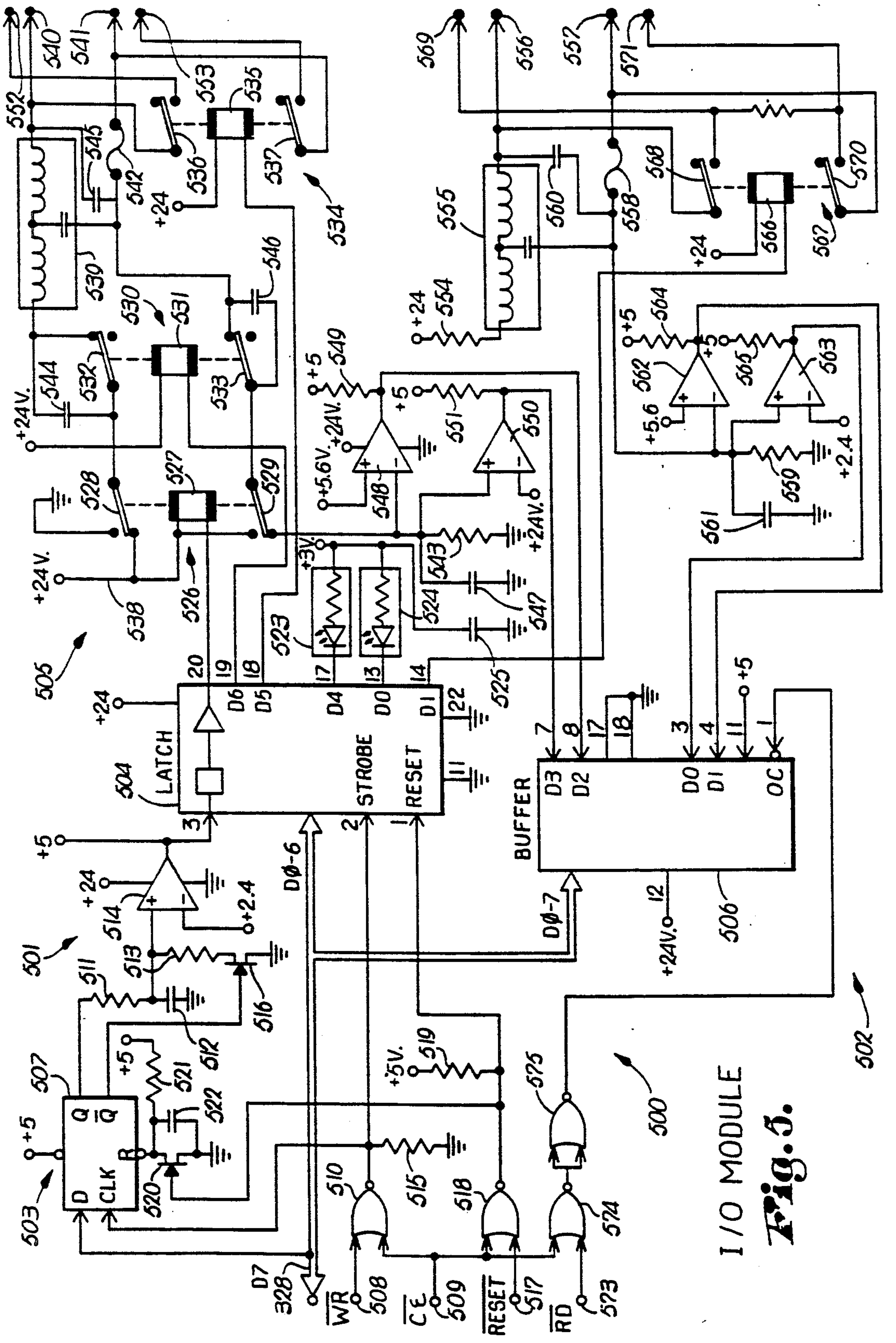
FIG. 5 is a schematic diagram of the detector pulse voltage control circuit.

FIG. 5 illustrates I/O module 500 connected via slot 7 of connector module 20 which includes output section 501 and input section 502. Sections 501, 502 are designed to receive respectively an input from a remote device such as a manual pull station for indicating a fire, or to provide an output in order to actuate a remote device such as a halon gas release system. Advantageously, module 500 can be configured for two outputs thereby forming a dual output module or for two inputs thereby forming a dual input module if desired. Module 500 with both an input and an output is illustrated so that the preferred embodiment of both can be described.

Output section 502 includes verification circuit 503, latch 504, output circuit 505, and input data buffer 506.

Verification circuit 503 interposes D-type flip-flop 507 between data line D7 of I/O bus 328 and pin 3 of latch 504 so that two write signals must be received at terminal 508 and two enable signals at terminal 509 before data is clocked through latch 504 as output via pin 20 thereof. Verification circuit 503 thereby requires that two command signals be received from CCU 300 before an output device connected to output section 501 can be actuated.

In operation, a logic low write signal received via terminal 508 and a logic low enable signal received via terminal 509 provide respective inputs to NOR 510. With both inputs low, the output from NOR 510 goes high to clock terminal CLK of flip-flop 507. Line D7 is connected to data terminal D of flip-flop 507 and the signal on terminal CLK clocks through data to output terminal Q.

Output terminal Q is connected to one side of resistor 511 (1M ohms). The other side of resistor 511 is connected to one side of capacitor 512 (1 u.F.) the other side of which is grounded, to one side of resistor 513

(100 ohms), and to the positive input terminal of comparator 514. The negative input terminal of comparator 514 is biased at +2.4 V.D.C.

When terminal Q of flip-flop 502 goes high at +5 V.D.C., this exceeds the reference voltage of +2.4 V.D.C. on comparator 514 and its output is thereby pulled high to pin 3 of latch 504. Capacitor 512 slows the voltage rise to the positive input terminal of comparator 514 so that its output does not go high until after the strobe signal is received at pin 2 of latch 504 from NOR 510. Thus, the first strobe signal received at pin 2 of latch 504 clocks through data at logic low (0 V.D.C.) from pin 3 to pin 20 and the output at pin 20 which is inverted remains at +24 V.D.C. and prevents actuation of the external device connected to output section 501.

When a second write signal and a second enable signal are received at terminals 508 and 509 respectively, a logic high signal is already present on latch pin 3 and the output at pin 20 is pulled low to 0 V.D.C. The output from NOR 510 is also connected to one side of resistor 515 (10 K ohms), the other side of which is connected to ground as shown.

Data lines 0–6 of I/O bus 328 connect directly to latch 504 as shown.

Flip-flop output terminal $\overline{Q}$ is connected to the gate of junction field effect transistor (FET) 516, the drain of which is grounded. The source terminal of FET 516 is connected to the other side of resistor 513.

In operation, when flip-flop 507 clocks through data at logic low, $\overline{Q}$ goes high which quickly enables FET 516 to pull the voltage low on the positive input terminal of comparator 514.

Module 500 receives reset signals from CCU 300 via terminal 517 which is connected to an input NOR 518 which also receives the enable signal from terminal 509. In the event a reset and enable signal are received, the output from NOR 518 is pulled high through resistor 519 (2.2 K ohms) the other side of which is connected to +5 V.D.C. as shown. NOR 518 output is also connected to reset terminal pin 1 of latch 504 and to the gate of junction field effect transistor (FET) 502. The source terminal of FET 520 is grounded and the drain terminal is connected to the inverted reset terminal of flip-flop 507 and to one side of pull-up resistor 521 (10 K ohms) the other side of which is connected to +5 V.D.C. as shown. Capacitor 522 (0.1 u.F.) is connected in parallel with FET 520 as shown.

When transistor 520 receives a reset signal from NOR 518, the input to reset terminal R of flip-flop 507 is pulled low to reset it.

Latch 504 (type UCN5801) latches and inverts the data received via I/O bus 328 and data line D7 by way of verification circuit 503. Pins 17 and 13 are connected respectively to light emitting diode units (type 560–0103) 523 and 524 the other sides of which are connected to +3 V.D.C. as shown which is also connected to one side of capacitor 525 (10 u.F.) the other side of which is grounded.

Output circuit 505 is designed to couple with an external polarized output device for supervised Class A wiring. Output 527 circuit 505 includes output relay 526 having coil 527 and contacts 528 and 529, "march" time relay 530 having coil 531 and contacts 532 and 533, and Class A relay 534 having coil 535 and contacts 536 and 537.

During normal operation when no output device is actuated, latch pin 20 is high at +24 V.D.C. preventing energizing of output relay 526. Supervisory current flows via line 538 through contact 528, contact 532, line 198, and transient suppression device 539 (type DSS310) to output terminal 540. Current flow continues from terminal 540 through the polarzied circuitry of the output device (not shown) and back to output terminal 541. The return current flows therefrom through fuse 542 (typically 375 milliamps), contact 533, contact 529, and resistor 543 (680 ohms) to ground.

Capacitor 544 (0.1 u.F.) intercouples one side of device 539 with contacts 528 and 532, and capacitor 545 (0.1 u.F.) intercouples terminal 540 with one side of fuse 542 as shown. In addition, capacitor 546 intercouples one side of contact 533 with the other side thereof as shown. Capacitor 547 (10 u.F.) is connected to ground and in parallel with resistor 543.

Output circuit 505 provides supervisory current as part of a Class A wiring system in order to detect a short or open circuit in the wiring leading to the remote output device to enhance reliability. The supervisory current flow through resistor 543 provides a voltage in the range of 2.8 to 4.0 V.D.C. which is connected to the negative input terminal of short circuit comparator 548. The positive input terminal of comparator 548 is connected to reference at 5.6 V.D.C. In the event of a short circuit between the wires leading to remote output device which in effect shorts terminals 540 and 541, the supervisory current increases to produce a voltage to the negative input terminal of comparator 548 which exceeds the reference voltage at +5.6 V.D.C. When this occurs, the output from comparator 548 goes low to pin 8 of data input buffer 506. The data from pin 8 is read on data line D2 of I/O bus 328. Pull up voltage is provided to the output of comparator 548 at +5 V.D.C. via resistor 549 (2.2 K ohms).

The voltage drop across resistor 543 is also provided to the positive input terminal of open circuit comparator 550, the negative input terminal of which is connected to reference at +2.4 V.D.C. In the event of an open circuit in the lines leading to the remote output device, the voltage on resistor 543, which is normally 2.8 to 4.0 V.D.C., falls below the level of the reference voltage of +2.4 V.D.C. and the output from comparator 550 goes low to pin 7 of buffer 506. This data is read via data line D3 of I/O bus 328. Pull up voltage to the output of comparator 550 is provided at +5 V.D.C. via resistor 551 (2.2 K).

When a short or open circuit occurs in the wiring leading to the output device, CCU 300 reads the data indicative thereof on I/O bus 328 and actuates Class A relay 534 by writing data on data line D5 to latch 504 which causes pin 18 to go low and sink current thereby energizing coil 535. When this occurs, contacts 536 and 537 operate in order to connect with output terminals 552 and 553 respectively. Terminals 552 and 553 are respectively connected to lines running parallel to the lines connected to terminals 540 and 541 to the remote output device. In others words, when a short circuit or open circuit occurs on the lines connected to terminals 540 and 541, Class A relay 534 switches to the parallel set of wires connected to terminals 552 and 543 respectively.

In the event two valid output command signals are written to latch 504, pin 20 thereof sinks current in order to energize output relay 526. When this occurs, contact 529 operates in order to connect with +24 V.D.C. and contact 528 operates to connect with ground as shown. With this arrangement, operating current then flows outwardly through terminal 541 (or terminal 553 if relay 534 has been energized) through the external device for actuation thereof and in through terminal 540 (or terminal 552 if relay 534 is energized) and through contact 528 to ground. This actuates the external device in a current flow direction opposite to that of the supervisory current.

March time relay 530, when actuated by CCU 300 via data line D6 and latch 504 pin 19, prevents all output through terminals 540, 541, 552 and 553 and is preferably used to "pulse" the output when the output device is an audible alarm. The audible alarm can be pulsed at different rates depending on the type alarm situation existing becoming more rapid as a suppressant release time nears, and finally continous when release occurs.

Input section 502 which also uses data buffer 506 reads an input from a remote device such as a manual pull station. Input section 502 also provides for supervisory current to detect short or open circuits and Class A wiring control similar to that of output section 501.

Supervisory current is produced by applying +24 V.D.C. to current limiting resistor 554 (1 K ohms) which flows therefrom transient suppression device 555 (type DSS310) and to terminal 556. The supervisory current then flows through the remote polarized input device and in through terminal 557, fuse 558 (typically 375 milliamps), and resistor 559 (200 ohms) to ground. Capacitor 560 (0.1 u.F.) intercouples terminal 556 and one side of fuse 558 as shown. Capacitor 561 (10 u.F.) is connected to ground and in parallel with resistor 559 as shown.

The voltage drop across resistor 559 is provided to the negative input terminal of short circuit comparator 562, the positive input terminal of which is connected to reference voltage at +5.6 V.D.C. as shown. As with output section 501, if a short circuit occurs in the lines leading to the remote input device, the supervisory current flow increases and produces a voltage drop through resistor 559 exceeding the reference voltage at +5.6 V.D.C. Comparator 562 output then sinks current and provides a logic low signal to buffer pin 4 which is read on data line D1.

Resistor 559 is also connected to the positive input terminal of open circuit comparator 563, the negative terminal of comparator 276 is connected to reference voltage at +2.4 V.D.C. as shown. In the event an open circuit occurs in the lines to the remote input device, the voltage on resistor 559 falls below the reference voltage level, and the output from comparator 563 goes low to pin 3 of buffer 506 which is read on data line D0. Pull-up voltage is supplied to the output of comparator 562 at +5 V.D.C. via resistor 564 (2.2 K ohms). Similarly, pull-up voltage is supplied at +5 V.D.C. the output of comparator 563 via resistor 565 (2.2 K ohms).

In the event a short or open circuit occurs in the lines leading to the remote input device, CCU 300 reads this information from buffer 506. CCU 300 is operable to write data to latch 504 which causes pin 14 thereof to sink current in order to energize coil 566 and thereby Class A relay 567 from a source at +24 V.D.C. as shown. With relay 567 energized, contact 568 thereof operates to intercouple terminal 556 with terminal 569 and to operate contact 570 to intercouple terminal 557 with terminal 571. Resistor 572 (1.5 K ohms) intercouples terminals 569 and 571.

The preferred input devices coupled to terminals 556, 557 include normally closed switches used as so-called "abort switches" to prevent a fire suppressant release condition and including an end-of-line resistor in parallel with the abort switches. An abort switch is active when open which creates an electrically open circuit condition as detected by comparator 563. The system configuration defines the reaction to this open circuit condition; and when the configuration defines terminals 556, 557 as being coupled with normally closed abort switches, CCU 300 reads an open circuit indication from comparator 563 as an active abort switch and not as an open circuit.

The preferred input devices coupled with terminals 556, 557 also include parallel normally open switches with a parallel end-of-line resistor which are used for manual pull stations to initiate an alarm situation. Activation of a manual pull station closes the switch which simulates an electrically short circuit condition which is detected by comparator 562. When the system configuration defines terminals 556, 557 as being coupled with normally open manual pull station switches, CCU 300 reads a short circuit condition from comparator 562 as an active manual pull station and not as a short circuit.

A read command for buffer 506 is received from CCU 300 at terminal 573 which is connected as one input to NOR 574, the other input to which is received from enable terminal 509. The output from NOR 574 is connected to both inputs of NOR 575, the output of which connects with inverting input pin 1 of buffer 506.

In the event a read signal at logic low is received at terminal 5573 along with a logic low enable signal at terminal 509, the output from NOR 574 goes high, the output from NOR 575 goes low, and buffer 506 seizes I/O bus 328.

Figure 6:
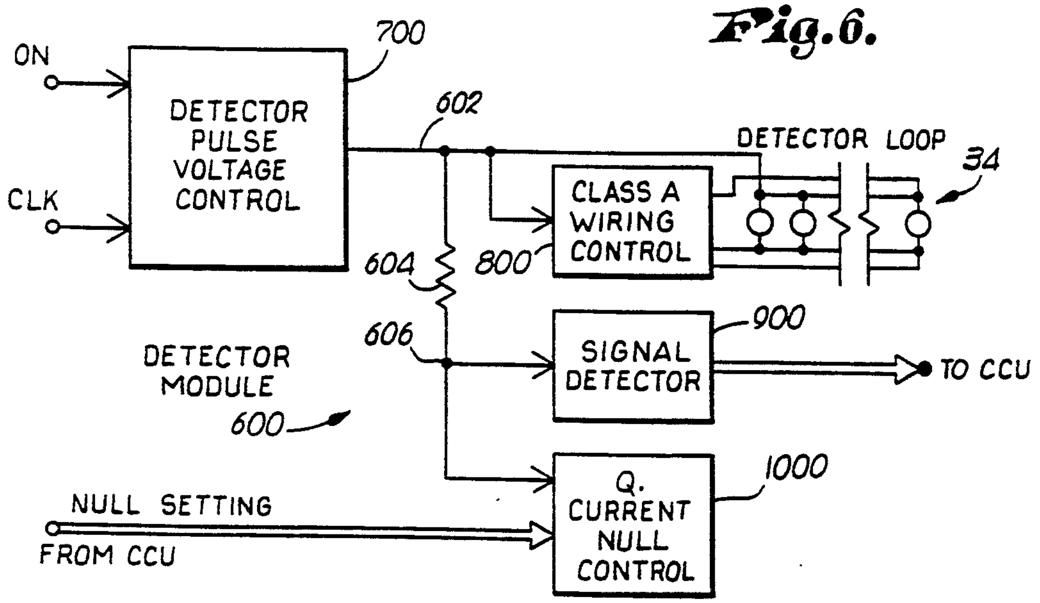
FIG. 6 is a schematic diagram of the Class A wiring control circuit.
Figure 10:
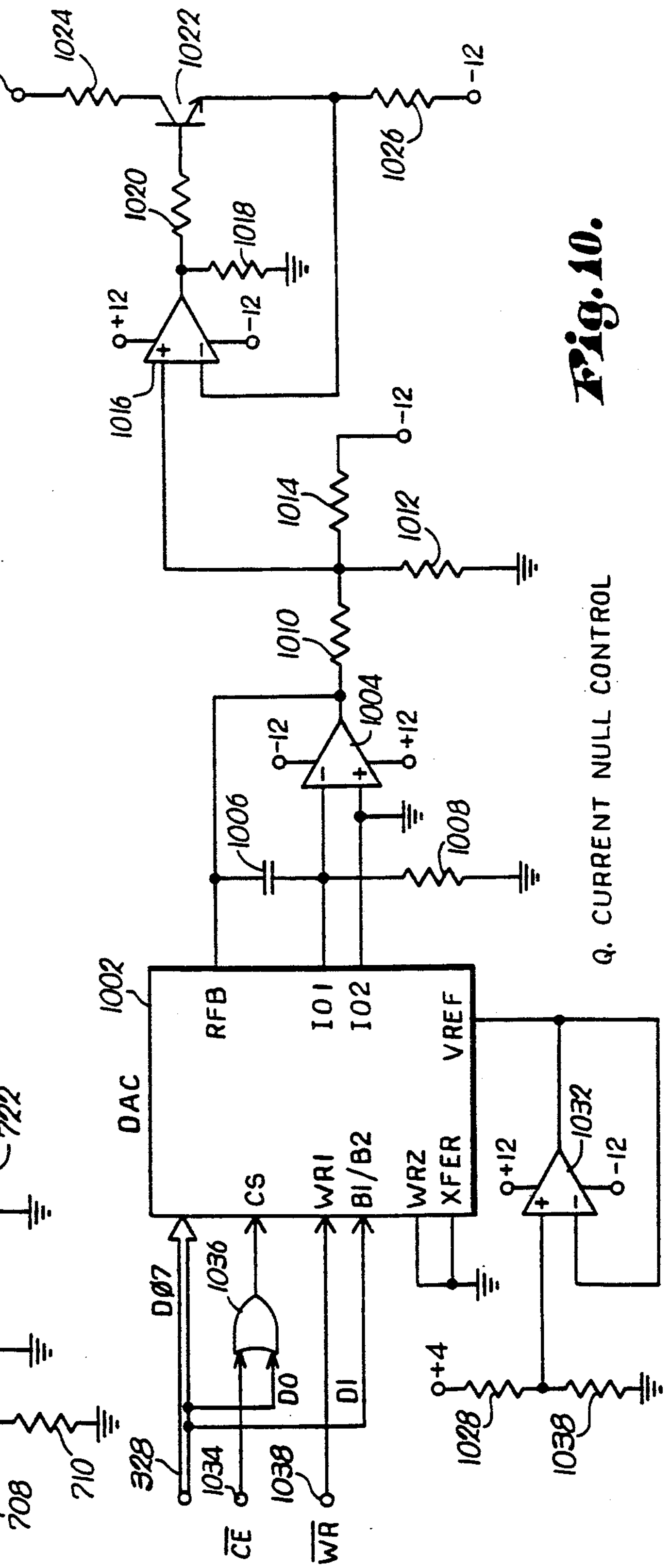
FIG. 10 is a schematic diagram of the display module.

FIG. 6 illustrates detector module 600 which controls detector loop 34 by providing the appropriate voltage pulses to poll the individual detectors and to receive the data therefrom. Module 600 includes detector pulse voltage control circuit 700 (FIG. 7), Class A wiring control circuit 800 (FIG. 8), signal detector circuit 900 (FIG. 9), and quiescent current null control circuit 1000 (FIG. 10). The output from detector pulse voltage control 700 connects to Class A wiring control 800 via line 602 and to one side of current limiting resistor 604 (221 K ohms). The other side of resistor 604 connects to signal detector 900 and Q. current null control 1000 via terminal 606.

Figure 7:
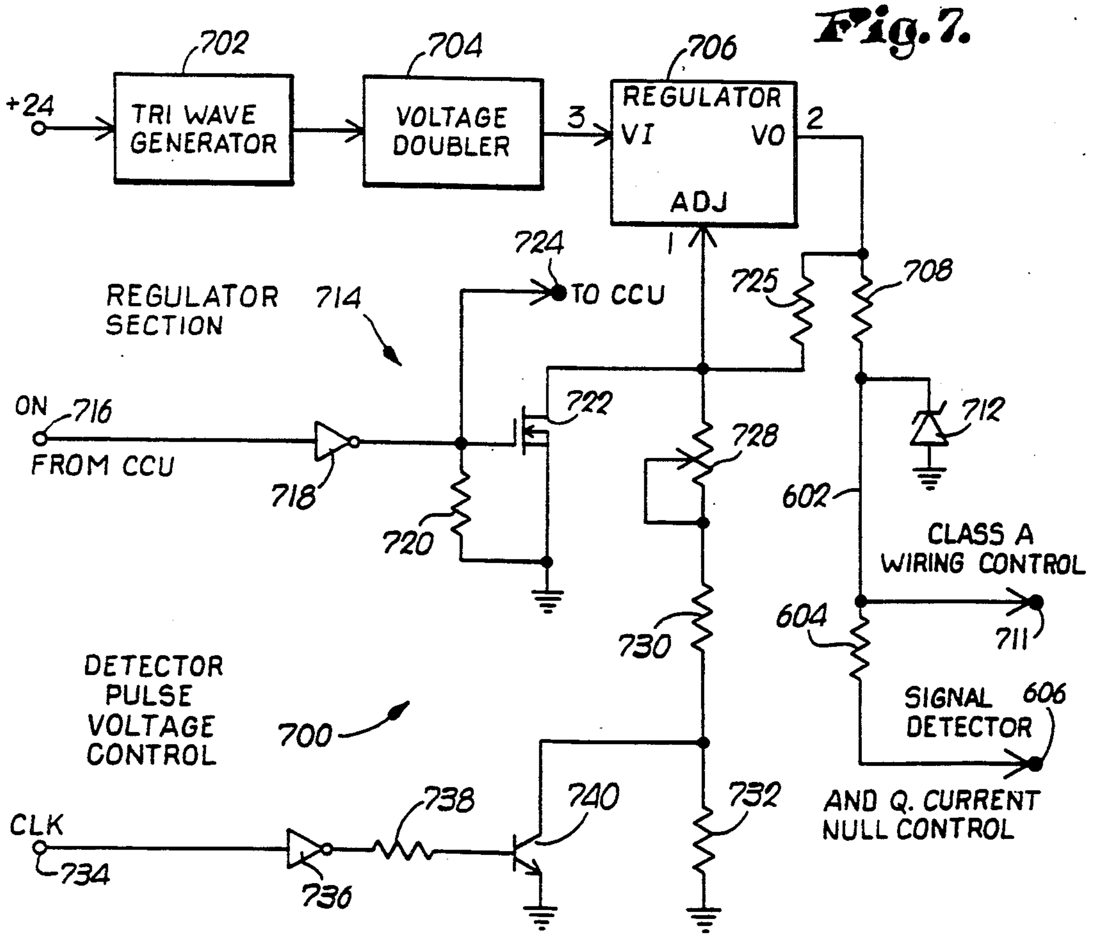
FIG. 7 is a schematic diagram of the voltage pulse control circuit.

FIG. 7 illustrates detector pulse voltage control 700 which provides operating power to detector loop 34 by providing a regulated output voltage at 26.5 V.D.C., and which provides voltage pulses at 38.5 V.D.C. in order to sequentially poll and reset the detectors and to actuate a test, light-emitting diode in each detector.

Circuit 700 receives input voltage at +24 V.D.C. as an input to conventional triangle wave oscillator 702 providing a triangle wave at 24 volts peak-to-peak. The output from generator 702 connects to conventional voltage doubler 704 which in turn provides an increased output at about 40–45 V.D.C. to pin 3 of conventional voltage regulator 706 (type LM317T). Regulator 706 provides a regulated steady state output at pin 2 thereof at 26.5 V.D.C. The regulated output from pin 2 connects to one side of output load sensing resistor 708 (10 ohms). The other side of resistor 708 is coupled with line 602 and output terminal 711 and thereby detectors 36 via circuit 800, the cathode of voltage limiting Zener diode 712 (type P6KE), the anode of which is grounded as shown, and resistor 604.

Regulator 706 receives an adjusting input at pin 1 thereof from regulator section 714 which provides the adjusting input to regulator 706 in order to cause the voltage pulses on the output thereof.

Regulator section 714 receives an "on" signal at logic high (+5 V.D.C.) directly from CCU 300 at terminal 716. The on signal is then inverted by inverter 718 which provides a logic low output to one side of pull down resistor 720 (5.1 K ohms) the other side of which is grounded, to the gate of field effect transistor (FET) 722, and to output terminal 724 which provides feedback directly to CCU 300 indicating that the "on" signal has been received. The drain terminal of FET 722 is connected via line 350 to pin 1 of regulator 706 and the source terminal thereof is grounded.

With the gate of FET 722 low, FET 722 is off, and resistor 725 (253 ohms) provides feedback voltage from the output of regulator 706 to pin 1 thereof which boosts the output. When the signal is absent from terminal 716 (i.e., at logic low), FET 722 is on which in turn shuts off the output at pin 2 thereof.

When FET 722 is turned off the output from regulator 706 begins to rise because the of feedback provided by feedback resistor 725 (243 ohms). The feedback voltage on regulator pin 1 is limited by the series-coupled network of potentiometer 728 (1.0 K ohms), resistor 730 (4.3 K ohms), and resistor (2.32 K ohms) connected to ground which allows the output of regulator 706 to rise to 38.5 V.D.C.

A logic low clock pulse received from CCU 300 at terminal 734 is inverted by inverter 736 which is conveyed via current limiting resistor 738 (10 K ohms) to the base of transistor 740, the emitter of which is grounded and the collector of which is connected to one side of resistor 732 as shown. The low going pulse at terminal 734 turns on transistor 740 and bypasses resistor 732 to ground which in turn lowers the feedback voltage to regulator pin 1 and lowers its output to 25.5 V.D.C.

In this way, CCU 300 toggles the output of regulator 706 between 26.5 and 38.5 V.D.C. by providing respective high at low signals at terminal 734.

Figure 8:
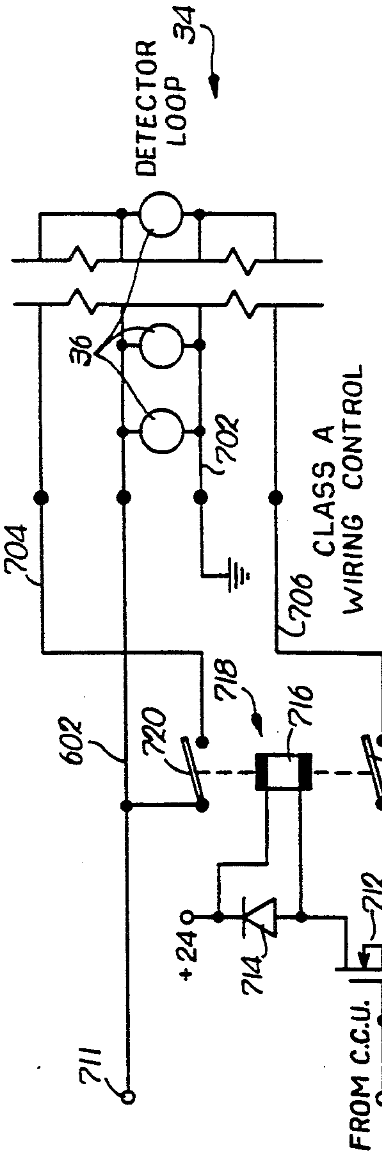
FIG. 8 is a schematic diagram of the signal detector circuit.

FIG. 8 illustrates Class A wiring control 800. Line 602 from circuit 700 supplies the operating power and voltage pulses to ne side of each detector 38 in loop 34. The other side of each detector is connected via line 702 to ground as shown. Class A wires 704 and 706 are provided in parallel with lines 602 and 702 respectively in order to improve the reliability of loop 34 in the event of a short or open circuit between or in lines 602 and 702.

As will be discussed further hereinbelow, signal detector circuit 900 (FIG. 9) monitors the magnitude of the current flow through detectors 38 in loop 34 and from the information obtained thereby determines whether a short or open circuit exists.

If a short or open occurs, CCU 300 provides a logic high signal at terminal 708 to one side of pull down resistor 710 (511 K ohms) the other side of which is grounded, and to the gate of FET 712. The source terminal of FET 712 is grounded and the drain terminal is connected to the anode of transient suppression diode 714 and to one side of coil 716 of Class A relay 718 having contacts 720 and 722 connected as shown. The cathode of diode 714 and the other side of coil 716 are connected to +24 V.D.C. Normally open contact 720 intercouples line 602 with line 704, and normally open contact 722 intercouples line 706 with ground.

With a logic high signal at terminal 708, FET 712 conducts and thereby energizes coil 716 to close contacts 720 and 722. This in turn places lines 704 and 706 in service in order to keep detectors 38 in service.

As will be explained further hereinbelow. detectors 36 each draw a normal operating current the total of which is a quiescent current flow through resistor 708 (FIG. 7) and then through line 602 to detectors 36. This current flow produces a voltage drop through resistor 708 such that the total of the voltage drop across resistor 708 and detector loop 34 equals 26.5 V.D.C. which is the voltage supplies as output from regulator 706. Detectors 36 sequentially convey information by adjusting the current flow therethrough. Signal detector circuit 900 (FIG. 9) monitors the voltage drop across loop 34 by monitoring the voltage at terminal 606 which is connected to line 602 and the detector loop by way of and resistor 604 (FIGS. 6 and 7). Thus, the voltage signal at terminal 606 is representative of the various current magnitudes flowing through detector loop 34 which are in turn representative of the particular environmental condition parameter being measured, that is, smoke obscuration.

Figure 9:
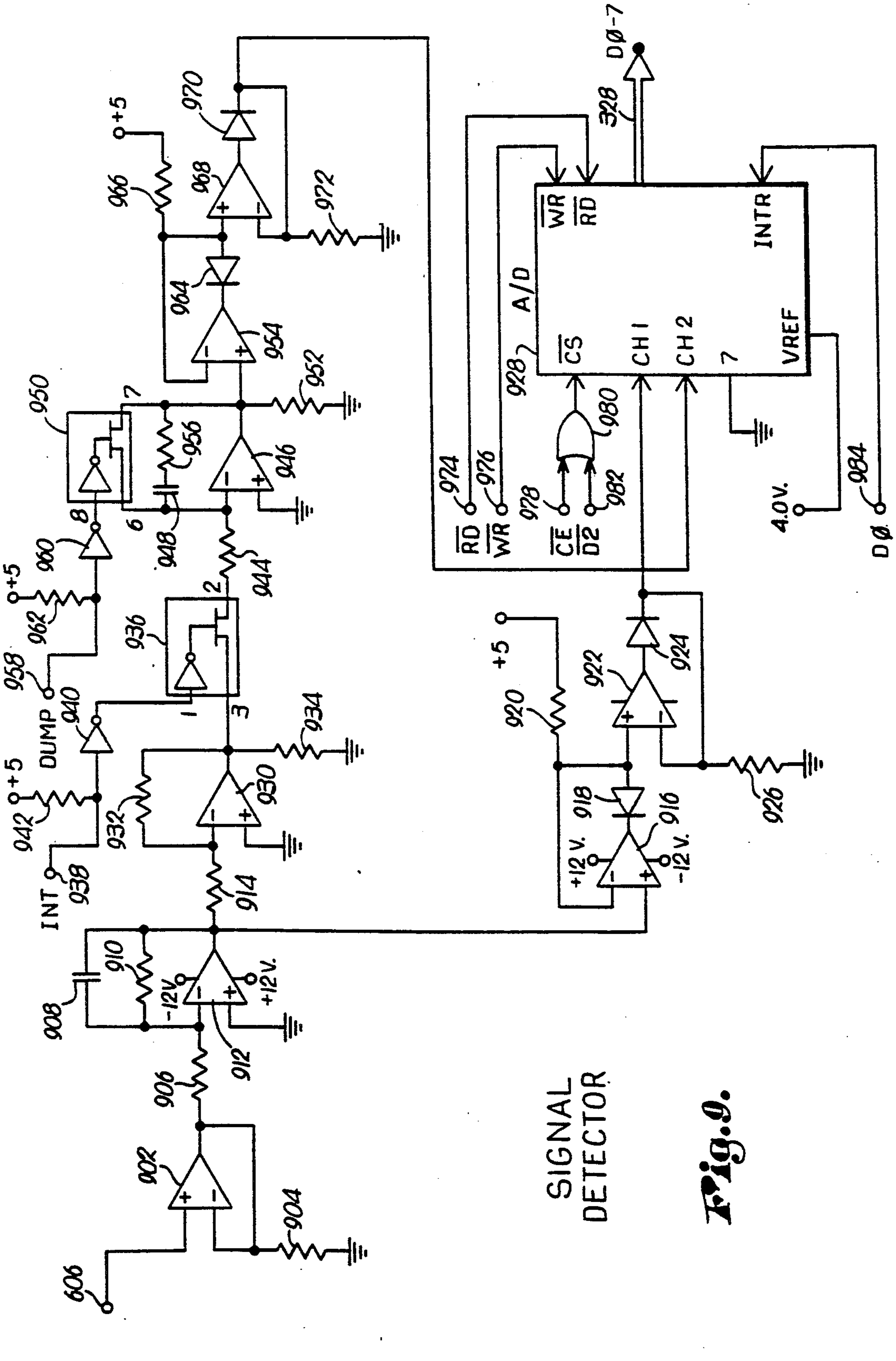
FIG. 9 is a schematic diagram of the input/output module.

FIG. 9 illustrates signal detector circuit 900. In general, circuit 900 converts the voltage monitored at terminal 606 to a digital value for transmission to CCU 300. More specifically, circuit 900 has two functions. First, it monitors the quiescent current flow through lop 34 as a quiescent voltage at terminal 606 in order to provide a digital voltage representative thereof to CCU 300. CCU 300 in turn provides a digital signal to Q current null control circuit 1000 (FIG. 10) which produces an output voltage at terminal 606 to offset the quiescent voltage and thereby compensate for the quiescent current. After Q. current null control circuit 1000 has compensated for the quiescent current flow, signal detector circuit 900 converts the voltage signals representative of the various current flow magnitudes through detector loop 34 into digital form for processing by CCU 300.

Signal detector 900 receives the voltage from terminal 606 at current-to-voltage, one-to-one amplifier 902 at the positive input terminal thereof. The output from amplifier 902 connects with the negative input terminal thereof, with one side of resistor 904 (5.5 K ohms) the other side of which is connected to ground, and with one side of resistor 906 (2.7 K ohms). The other side of resistor connects with one side of capacitor 908 (0.001 u.F.), one side of resistor 920 (27.4 K ohms) and to the negative input terminal of amplifier 912 (type LF347N). The positive input terminal to amplifier 912 is connected to ground as shown and receives supply voltage at +12 and −12 V.D.C.

Amplifier 912 output connects with the other side of capacitor 908, the other side of resistor 910, one side of resistor 914 (27.4 K ohms), and to the positive input terminal of voltage limiting amplifier 916.

Amplifier 912 provides ten-to-one amplification of the input voltage with an output span from −12 V.D.C. to +12 V.D.C. Amplifier 916 and the circuitry associated therewith receive the amplified voltage from amplifier 912 and convert to a span from 0 to +5 V.D.C. as suitable input to the analog-to-digital converter.

Amplifier 916 output connects with the cathode of diode 918, the anode of which is connected to the negative input terminal of amplifier 916, to one side of resistor 920 (5.1 K ohms) and to the positive input terminal of voltage limiting amplifier 922. The other side of resistor 920 connects with +5 V.D.C. as shown. With this arrangement, the output from amplifier 918 is limited to a maximum positive voltage of +5 V.D.C. and amplifier 922 limits the low voltage to 0 volts.

The output from amplifier 922 connects with the anode of diode 924, the cathode of which is connected to the negative input terminal of amplifier 922, to one side of pull down resistor 926 (5.1 K ohms) the other side of which is connected to ground as shown, and to terminal CH1 of analog-to-digital (A/D) converter 928. A/D 928 provides a digital output representative of the quiescent current flow on I/O bus 328 to CCU 300.

The remaining portions of signal detector circuit 900 beginning with resistor 914 integrate voltage levels representative of the successive current levels in detector loop 34 for reception at terminal CH2 of A/D 928.

The other side of resistor 914 connects with to the negative input terminal of one-to-one buffer amplifier 930 and with one side of resistor 932 (27.4 K ohms). The positive input terminal of amplifier 930 is connected to ground as shown and the output thereof is connected to the other side of resistor 932, to one side of pull down resistor 934 (5.1 K ohms), and to pin 3 of unijunction device 936 (type DG201).

Device 936 includes an internal unijunction transistor and inverter as shown. Pin 1 of device 936 receives an inverted input from terminal 938, inverter 940. One side of pull up resistor 942 (10 K ohms) connects with terminal 938 and the other side is connected to +5 V.D.C.

CCU 300 provides a logic high "integrate" signal at terminal 938 which is inverted by inverter 940 to supply a logic low input at pin 1 of device 936. This in turn enables device 936 to pass the input from pin 3 to output pin 2.

Device 936 output at pin 2 is connected to one side of resistor 944 (10.0 K ohms). The other side of resistor 944 is connected to the negative input terminal of integrator amplifier 946, to one side of integrator capacitor 948 (0.1 u.F.) and to pin 6 of device 950 which is identical and included on the same semiconductor chip as device 936. The positive input terminal of amplifier 946 is connected to ground as shown and the output thereof is connected to one side of pull down resistor 952 (5.1 K ohms) the other side of which is grounded, to the positive input terminal of voltage limiting amplifier 954, to one side of resistor 956 (270 ohms), and to pin 7 of device 950. Capacitor 948 and resistor 956 are interconnected as shown.

CCU 300 provides the logic high integrate signal at terminal 938 for one millisecond during which time amplifier 946 and capacitor 948 integrate this signal. At the end of one millisecond, the integrate signal goes off and the integrated voltage as output from amplifier 946 is held for conversion by A/D 928.

After conversion, CCU 300 provides a logic high "dump" signal at terminal 958 and to inverter 960 which inverts the signal to logic low at pin 8 of device 950. Device 950 is thereby enabled and discharges capacitor 948 through resistor 956 to reset the circuit for another integration cycle. Pull up voltage is provided at +5 V.D.C. to terminal 958 by way of resistor 962 (10 K ohms).

The output from integrator amplifier 946 is received at the positive input terminal of limiting amplifier 954. The output therefrom is connected to the cathode of diode 964, the anode of which is connected to the negative input terminal of amplifier 954 and to one side of pull up resistor 966 (5.1 K ohms) the other side of which is connected to +5 V.D.C. as shown. As with amplifier 916, amplifier 954 limits the integrator voltage signal to +5 V.D.C.

The anode of diode 964 is also connected to the positive input terminal of limiting amplifier 968 the output of which is connected to the anode of diode 970. The cathode of diode 970 is connected to one side of pull down resistor 972 (5.1 K ohms) the other side of which is grounded, and to terminal CH2 of A/D 928. Amplifier 968 limits the lower voltage of the integrated voltage signal to 0 volts.

A/D 928 receives a logic low read signal from CCU 300 at terminal 974 which is received at terminal $\overline{RD}$ of A/D 928. A logic low write signal is received from CCU 300 at terminal 976 which is received at A/D terminal $\overline{WR}$.

CCU 300 produces a logic low enable signal at terminal 978 as an input to OR 980 which receives its other input from terminal 982 as a logic low data signal from I/O bus 328. The output from OR 980 is connected to terminal $\overline{CS}$ of A/D 928. A/D 928 also receives an interrupt signal at terminal $\overline{INTR}$ from CCU 300 at terminal 984 which is connected to data line 0 of I/O bus 328. A/D 928 terminal 7 is connected to ground as shown and VREF is connected to 4.0 V.D.C.

As discussed above, CCU 300 reads a digital value on I/O bus 328 representative of the quiescent voltage on terminal 606 as produced by A/D 928 when reading CH1. CCU 300 also reads a digital value representative of the current magnitudes on detector loop 34 as integrated by capacitor 948 and supplied to A/D 928 terminal CH2.

FIG. 10 illustrates quiescent null control circuit 1000 which compensates for the quiescent current in detector loop 34 at terminal 606. CCU 300, in response to the digital values representative of the quiescent current received by signal detector 900, sends a corresponding compensating digital value by way of I/O bus 328 to digital-to-analog converter (DAC) 1002 (type DAC1230). In response, DAC 1002 produces an analog output at DAC terminals IO1 and IO2 which are connected to the respective negative and positive input terminals of current-to-voltage amplifier 1004 (type LF347N). Terminal IO1 is also coupled with one side of capacitor 1006 (22 p.f.) and to one side of pull down resistor 1008 (5.5 K ohms) the other side of which is grounded. Terminal IO2 is also grounded.

The output from amplifier 1004 is connected to the other side of capacitor 1006, to DAC terminal RFB, and to one side of output resistor 1010 (1.82 K ohms). The other side of resistor 1010 connects to one side of resistor 1012 (15.4 K ohms) the other side of which is grounded, to one side of resistor 1014 (5.11 K ohms) the other side of which is connected to −12 V.D.C. as shown, and to the positive input terminal of amplifier 1016 (type LF347N).

The output voltages produced by amplifier 1004 ranges between −2.90 and −5.34 V.D.C. as input to the positive input terminal of amplifier 1016. The output from amplifier 1016 is connected to one side of pull down resistor 1018 (10 K ohms) the other side of which is grounded, and to one side of resistor 1020 (330 ohms).

The other side of resistor 1020 is connected to the base of transistor 1022 (type 2N4123). The collector of transistor 1022 is connected to one side of resistor 1024 (8.2 K ohms) the other side of which is connected to terminal 606 and the emitter is connected to the negative input terminal of amplifier 1016 and to one side of resistor 1026 (68.1 K ohms), the other side of which is connected −12 V.D.C. as shown.

Reference voltage is provided to DAC 1002 using the voltage divider network composed of resistor 1028 (1.1 K ohms) one side of which is connected to +4 V.D.C. and the other side of which is connected to one side of resistor 1030 (10.0 K ohms) which is grounded as shown. The junction between resistors 1028 and 1030 is connected to the positive input terminal of one-to-one amplifier 1032 (type LF347N). The output of amplifier 572 provides reference voltage at +3.60 V.D.C. to terminal VREF of DAC 1002 and which also provides feedback to the negative input terminal of amplifier 1032.

CCU 300 provides control signals to DAC 1002 which include a logic low enable signal provided at terminal 1034 as one input to OR 1036. The other input to OR 1036 is data line D0 from I/O bus 328. The output from OR 1036 is connected to terminal CS of DAC 1002.

Additionally, DAC 1002 also receives a logic low write signal at terminal WR1 thereof from CCU 300 via terminal 1038. Data line D1 is connected via line 584 to DAC terminal B1/B2.

In operation, amplifier 1016, transistor 1022, and the associated resistors comprise an adjustable current source the resulting effect of which compensates for the quiescent current flow in detector loop 34 by balancing the quiescent voltage at terminal 606. As will be explained further hereinbelow, CCU 300 performs successive iterations of adjustment until the quiescent voltage is balanced within predetermined limits.

FIG. 11 illustrates display module 1100 which provides a liquid crystal display of alarm and trouble conditions, locations of these conditions, and other information concerning the operation of system 30. Additionally, module 1100 provides the interface for various membrane switches and also illuminates certain LED's indicative of the status of system 30.

More particularly, module 1100 includes microprocessor-based liquid crystal display (LCD) 1102 (type PWB-16230) which receives data from CCU 300 via I/O bus 328. CCU 300 also provides range control inputs to LCD 1102 including a register select signal from terminal 1104 provided to LCD terminal RS. Additionally, CCU 300 provides read/write signals via terminal 1106 to LCD terminal R/W. An LCD enable signal is conveyed via terminal 1108 to LCD terminal EN. One side of pull down resistor 1100 (5.1 K ohms) is connected to terminal 1108 and the other side is connected to ground.

LCD display 1102 provides an output at pin 15 to pin 2 of conventional LCD backlight 1112 in order to sink current for illumination of the display. Pin 1 of backlight 1112 is connected to +5 V.D.C.

Module 1100 also provides for input buffering of six membrane switches 1114 having the functions as indicated in FIG. 11. Input buffering is provided by device 1116 (type 74C923) which is intercoupled with membrane switches 1114 as shown. Device 1116 is also coupled with I/O bus 328 for delivering data indicative of which membrane switch is depressed to CCU 300. Device 1116 receives an enable signal from CCU 300 via terminal 1118 to device terminal $\overline{OE}$ as shown. Device pin 6 connects to one side of capacitor 1120 (0.1 u.F.) the other side of which is grounded and device pin 7 connects to capacitor 608 (1.0 u.F.) the other side of which grounded. Device 1116 receives an interrupt signal from CCU 300 via terminal 1124 at terminal DA.

Module 1100 also includes an output buffer device 1124 to actuate four lightemitting diodes (LED's) 1126, 1128, 1130, and 1132 and a piezoelectric buzzer 1134. Device 1124 (type 74LS373) is connected to data lines D0-7 of I/O bus 328 as shown. Data lines D1 and D3 are respectively coupled to one side of resistors 1136 and 1138 (2.2 K ohms each) the other sides of which are connected to +5 V.D.C. Data lines D0, 2, and 4 are respectively coupled with one side of pull down resistors 1140, 1142 and 144 (5.1 K ohms each) the other sides of which are connected to ground as shown. Device 1124 receives a strobe signal from CCU 300 at device pin 11 terminal 1146.

Depending on the data received via data bus 328, device 1124 is operable to provide an output at pin 2 to one side of resistor 1148 (5.0 ohms) the other side of which is connected to the base of transistor 1150. The emitter of transistor 1150 is connected to ground as shown and the collector is connected to pin 3 of backlight 1112 for acutation thereof.

Pin 5 of device 1124 provides an output to piezo buzzer 1134 which is also connected to +5 V.D.C. as shown.

Device pin 6 is connected to inverter 1152 which is in turn connected to the cathode of LED 1126. The anode of LED 1126 is connected to one side of current limiting resistor 1154 (160 ohms) the other side of which is connected to +5 V.D.C.

Device pin 9 connects to inverter 1156. The output from inverter 1156 is connected to inverter 1158 and to the cathode of LED 1130. The anode of LED 1130 is connected to one side of current limiting resistor 1160 (160 ohms) the other side of which is connected to +5 V.D.C.

The output from inverter 1158 is connected to the cathode of LED 1128 the anode of which is connected to one side of current limiting resistor 1162 (160 ohms). The other side of resistor 1162 is connected to +5 V.D.C.

Device pin 12 connects to the input of inverter 1164 the output of which connects to the cathode of LED 1132. The cathode of LED 1132 is connected to one side of current limiting resistor 1166 (160 ohms) the other side of which is connected to +5 V.D.C. as shown.

Depending upon the type of abnormality experienced by system 30, the appropriate data is transmitted via I/O bus 328 to actuate appropriate LED's 1126–1132. Such occurences also actuate piezo buzzer 1134 which can be silenced by depressing the "silence" membrane switch 1114 in which case LED 1132 is actuated and thereby illuminated, for example.

The preferred detector 36 is manufactured by Hochiki Kabushiki Kaisha of Tokyo, Japan type ALA-E3 and is designed to detect smoke obscuration as a percent per meter. As discussed above, detector module 600 supplies continuous operating power at 26.5 V.D.C. CCU 300 in turn provides pulse signals which are modified by detector module 24 to provide voltage pulses up to 38.5 volts thereby producing a pulse voltage rise of 12.0 volts.

Figure 12:
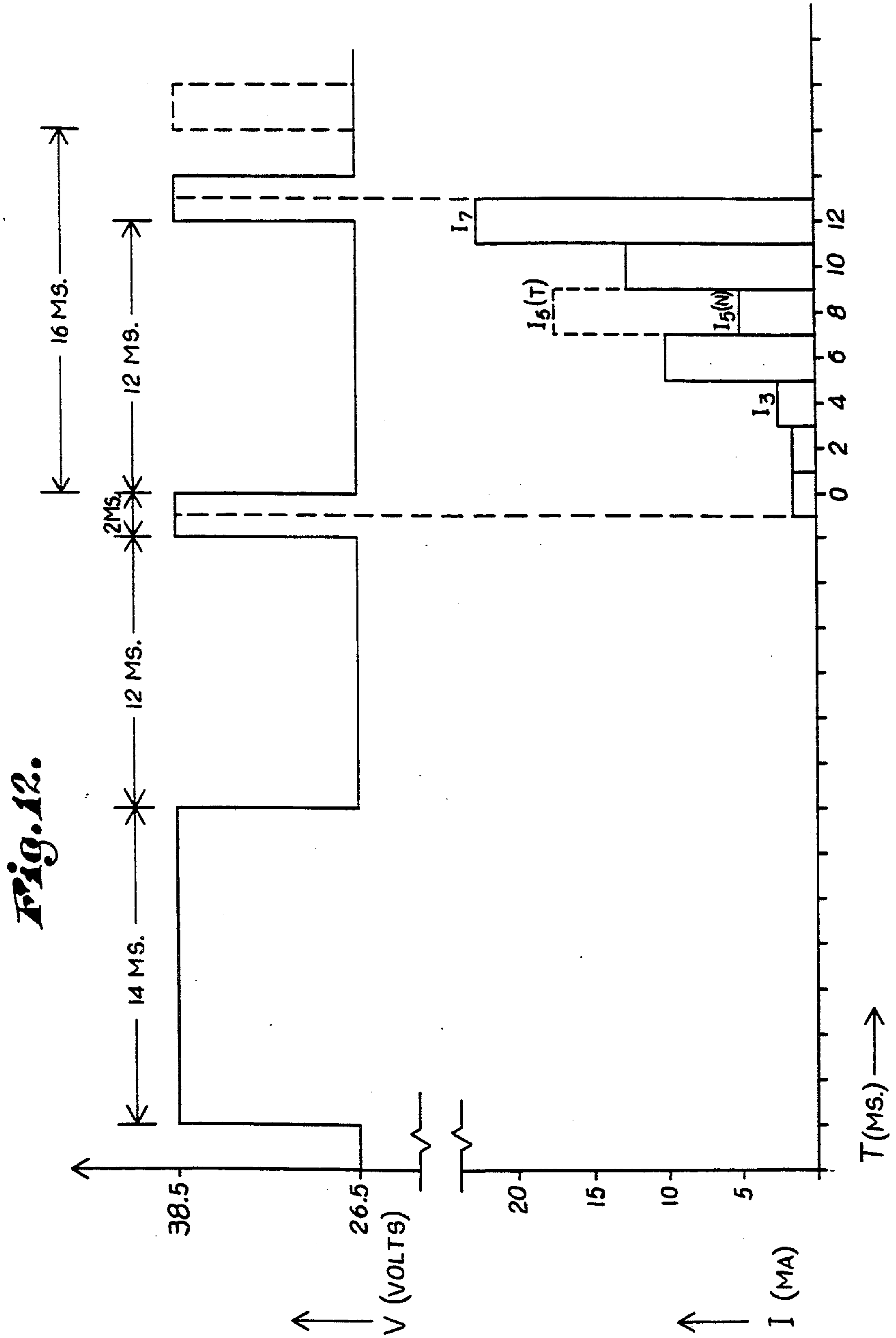
FIG. 12 is a graph illustrating the voltage pulses to the detectors and the analog current signals received therefrom.

As illustrated in FIG. 12, the voltage pulses each last for 2 milliseconds and are normally spaced apart by 12 milliseconds (that is, on a 14 millisecond cycle).

Each detector 36 is assigned a sequential identification number and is designed to sense and count the number of voltage pulses imposed on detector loop 34. When the number of pulses sensed corresponds to the identity number of the individual detector, that detector is then actuated to impose sequential analog currents as data onto detector loop 34. This data is in turn sensed by signal detector circuit 600, converted into digital form, and transmitted to CCU 300.

During the 14 millisecond period between the center of one voltage pulse and the center of the next voltage pulse, the polled detector sends seven analog current levels each lasting two milliseconds. These analog current levels called "states" correspond to predetermined types of data. For example, state $I_3$ represents a reference current level corresponding to the normal steady current flow through the polled detector. State $I_5(n)$ represents the sensed level of smoke obscuration as a percent per foot. State $I_7$ represents a predetermined current level which indicates the type of detector. For example, other types of detectors could be included such as ionization or temperature.

Each detector 36 also includes a test, light-emitting diode (LED) which, when actuated, places the detector in a test mode to provide a reference illumination simulative of 4.5% per meter smoke obscuration. When acutated, the data representative of this reference obscuration is transmitted as $I_5(t)$ in place of $I_5(n)$. The test LED's in all the detectors are actuated by spacing out the voltage pulses in order to provide two successive 16 millisecond gaps between voltage pulses rather than the normal 12 milliseconds. That is to say, when a detector senses two successive intervals of 16 milliseconds between voltage pulses, the detector acutates its test LED. A subsequent single 16 millisecond interval causes the detector to deactivate the test LED and thereby return to the normal mode.

U.S. Pat. Nos. 4,555,695 and 4,388,616, which are hereby incorporated by reference explain further details concerning detectors 36 and applications thereof.

System 30 is designed to handle up to 127 detectors 36 on a single detector loop 34. After 127 voltage pulses have been imposed on detector loop 34 thereby polling all detectors 36, detector module 600 as controlled by CCU 300 emits a single 14 millisecond pulse as illustrated in FIG. 12 which resets to zero all of the internal detector counters. Detectors 36 are then ready for the next cycle.

II. Operating Program

FIGS. 13A-21C illustrate the computer program flowchart for the pertinent portions of the computer program for operating microprocessor 302 (FIG. 3) and thus system 30. In the preferred system, microprocessor 302 is an Intel type 8097 and the program is accordingly written in PLM which is a high level language appropriate for the preferred microprocessor. Those skilled in the art will appreciate that the computer program as illustrated in the flowcharts can be implemented in other languages as a matter of design choice and as appropriate for a selected computer system which in additional to other types of microprocessors might include a minicomputer or even a main frame. The operating program is stored in program ROM 318.

Figure 13A:
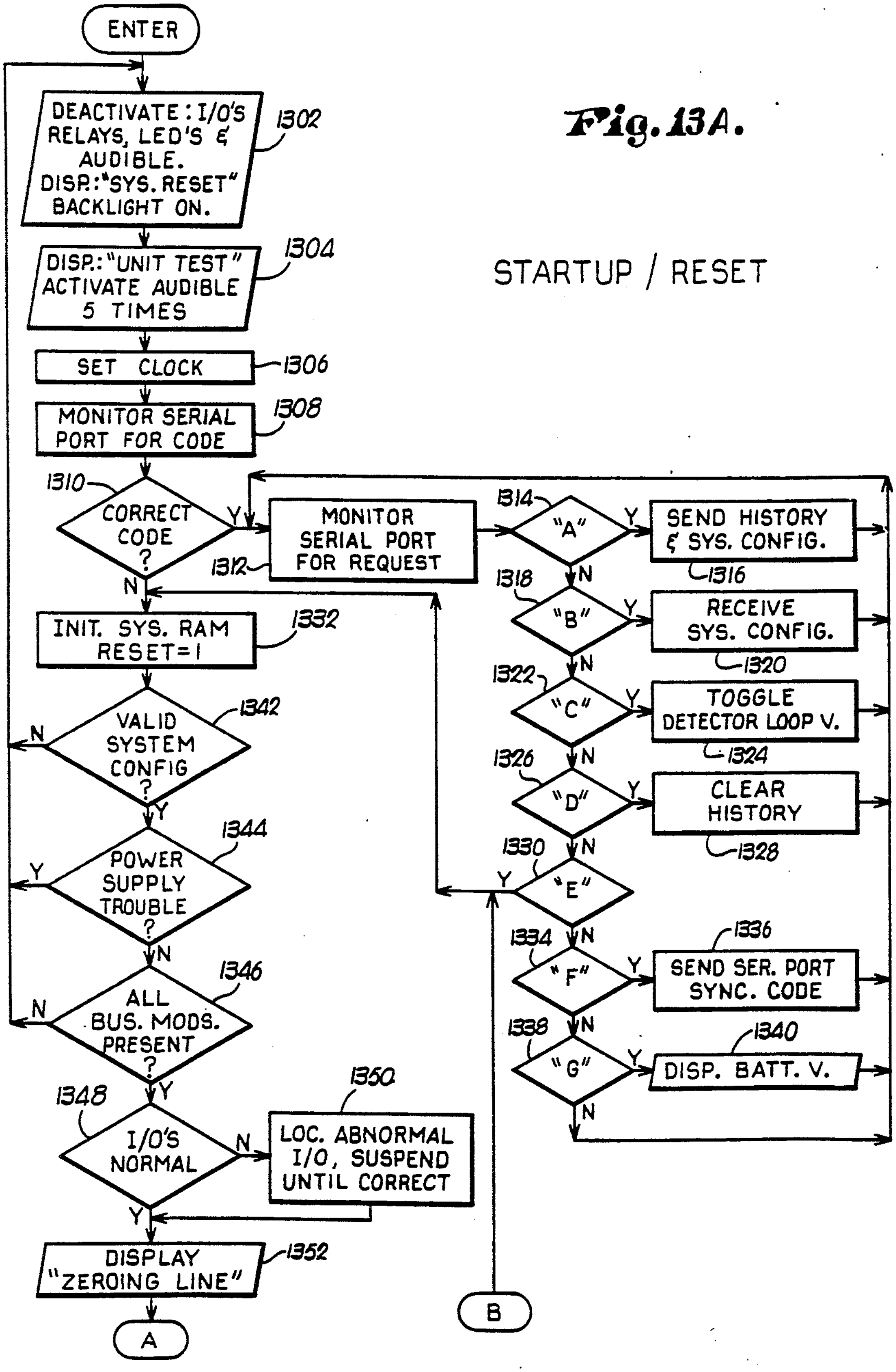
FIG. 13*a* is a computer program flowchart indicating the first portion of the START-UP/RESET routine.

FIGS. 13A,B illustrate the subroutine STARTUP/RESET. This subroutine is executed during power up, whenever watchdog 308 times out and initiates a reset, or when the reset membrane 1114 switch is depressed.

The programs enters STARTUP/RESET subroutine at step 1302 which deactivates all of the input or output modules 500 including the Class A relays associated therewith. In addition, this step deactivates LED's 1126-1132 (FIG. 11) and the audible piezo buzzer 1134. At this time CCU 300 also activates LCD 1102 in order to activate back light 1112 and to display the message "SYSTEM RESET".

In step 1304, CCU 300 activates LCD 1102 to display the message "UNIT TEST" and to activate buzzer 1134 five times.

In step 1306 the program pauses to allow real time clock 306 to be reset if needed.

The program then moves to step 1308 to monitor serial port interface 304 for entry of a predetermined code number. If the correct code number is entered in step 1310, the program moves to step 1312 to monitor serial port 304 for an appropriate code letter indicative of the requested function.

If the letter "A" is entered in step 1314, the program moves to step 1316 in which CCU 300 sends the system history from NVRAM 322 and the system configuration from NVRAM 324 as output via serial port 304. The program then loops to step 1312.

If the letter "B" is entered in step 1318, the program moves to step 1320 in which CCU 300 accepts new system configuration data via serial port 304 for storage in NVRAM 324 after which the program loops to step 1312.

If the letter "C" has been entered, the program in step 1324 toggles the voltage on detector loop 34. That is to say, CCU 300 causes detector module 600 to send a voltage pulse over the lines of loop 34 which is useful in performing a manual test of the integrity of the lines. The program then loops to step 1312.

If the letter "D" is entered in step 1326, the program moves to step 1328 to clear the system history as stored in NVRAM 322 and then loops to step 1312.

If the letter "E" has been entered in step 1330, the program loops to step 1332 which will be discussed further hereinbelow.

If the letter "F" has been entered in step 1332, the program in step 1336 outputs a conventional serial port synchronizing code and then loops to step 1312.

If the letter "G" has been entered, the program moves to step 1340 to output data representative of the battery voltage and loops to step 1312.

When operations via the serial port have been completed, and the letter "E" has been entered, the program loops to step 1332 to initialize system RAM 320 and to set the flag "reset".

The program then moves to step 1342 in which the program checks the system configuration as stored in NVRAM 324. In this step, the program checks for inconsistencies in the system configuration. Such inconsistencies might include a configuration for more than 127 detectors on a given loop, the lack of a sensitivity setting for a detector 36, more than eight connector modules, and so forth. If any inconsistencies are determined, the system configuration is not valid and the program loops to step 1302 and continues to loop until a valid system configuration is present.

If a valid system configuration has been stored in NVRAM 324, the program moves to step 1344 which determines whether all of the required power supply voltages are being received within predetermined limits. If no, the program loops back to step 1302 until correct power supply voltages are present.

Step 1346 determines whether all of the input, output, and detector modules are present as required by the system configuration. This step is provided to ensure that a module removed for repair or adjustment has been returned to the system, and to ensure that all of the modules are electrically coupled with the system. If all of the required modules are not present the program loops back to step 1302 and until all are present.

The program then moves to step 1348 in which the program determines whether all the input and output modules are normal, for example, whether any shorts or opens exist on any supervised wiring. If all of the input-/output modules are not normal, the program pauses in step 1350, determines the location of any abnormal input/output module, stores this information in history NVRAM 322, and displays an appropriate message on LCD 1102. The program waits until the problem has been corrected.

Figure 13B:
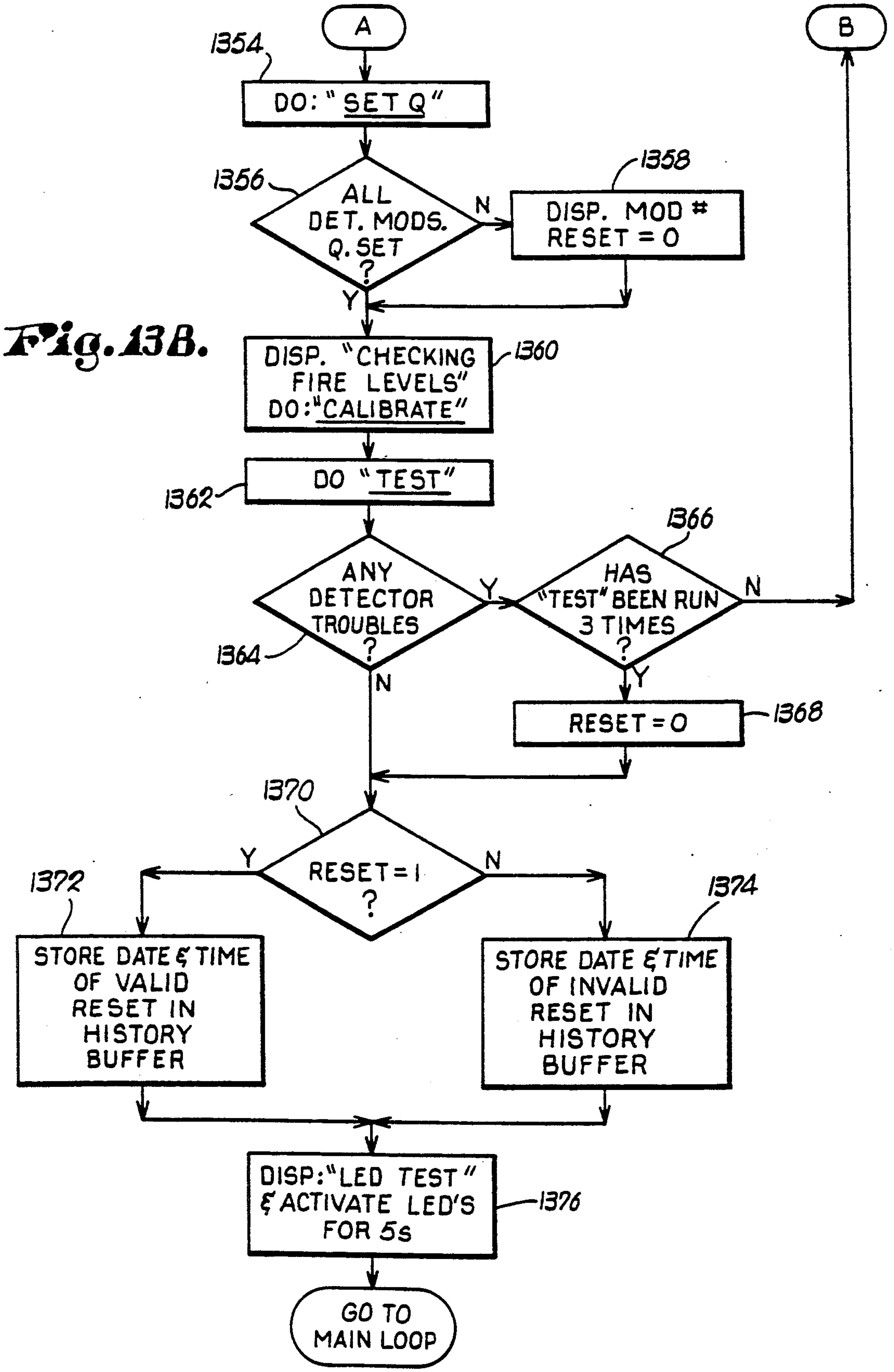
FIG. 13 is a computer program flowchart illustrating the second part of the START-UP/RESET routine.

After steps 1348 or 1350, the program moves to step 1352 to activate the message "ZEROING LINE" on LCD 1102 which means the program is entering the subroutine SET Q in step 1354 (FIG. 13b). As will be explained further hereinbelow, this subroutine operates Q. current null control circuit 100 to compensate for the quiescent current flowing in detector loop 34.

After executing the subroutine SET Q the program asks in step 1356 whether the quiescent current for all of the detector modules and associated detector loops was successfully completed. If not, the program moves to step 1358 to store this information in history NVRAM 322 and to display this information on LCD 1102. Step 1358 also clears the flag RESET.

After steps 1356 or 1358, the program moves to step 1360 to display the notation "CHECKING FIRE LEVELS" on LCD 1102 and to execute the subroutine CALIBRATE which calibrates the detectors (FIG. 16) as will be explained further hereinbelow.

The program then moves to step 1362 to execute the subroutine "TEST" (FIG. 17) which tests the current levels at each of the states for each of the detectors 36 for operation within preset limits as will be explained further hereinbelow.

The program then moves to step 1364 which asks whether any of the detectors have any troubles associated therewith as determined by the subroutines CALIBRATE and TEST. If any detector troubles exist, the program moves to step 1366 which asks whether the subroutine TEST has been executed three times. This step is included to require that the subroutine TEST be conducted three times to ensure that a defective detector is not erroneously indicated. If the TEST has not been executed three times, the program loops back to step 1332 and continues to do so until subroutine TEST has been executed three times at which point the program moves to step 1368 to clear the "RESET" flag.

After step 1364 or step 1368, the program moves to step 1370 which asks whether the RESET flag is set. If yes, this indicates that the system has compensated for the quiescent current in all detector loops and no detector troubles exist. Accordingly, the program moves to step 1372 to store the real time as indicated by real time clock 306 and to indicate that the reset was validly conducted which information is stored in history NVRAM 322.

If the reset flag was cleared in either step 1358 or 1368 which would indicate the existence of a "trouble", the program moves to step 1374 which stores the date and time of an invalid reset sequence in history NVRAM 322.

After steps 1372 or 1374, the program moves to step 1376 to display the notation "LED TEST" on LCD 1102 and to activate LED's 1126–1132 for five seconds. Step 1376 completes execution of subroutine STARTUP/RESET and the program moves to subroutine "MAIN LOOP" as illustrated in FIGS. 13a and b.

Broadly speaking, MAIN LOOP automatically and periodically resets the compensation levels for the quiescent current on detector loop 34, calibrates the detectors, and tests the detectors for operation within preset limits. Additionally, this subroutine monitors for a variety of troubles or system defects. Importantly, MAIN LOOP reads detectors 36, checks and analyzes the data received therefrom, and further analyzes the data in view of the system configuration to determine whether any alarm conditions or troubles exist and activates the appropriate devices in response.

Subroutine MAIN LOOP enters at step 1402 which determines whether it is time for a system check, and also whether no alarms exist at this time. Advantageously, the system check is programmed to occur once a week at an appropriate time when operating personnel are in attendance to correct for any troubles which may be detected. Step 1402 prevents the operation of the system check if the system is currently in an alarm condition.

If the answer in step 1402 is yes, the program moves to step 1404 to display the notation "DETECTOR TEST" on LCD display 586. Step 1402 also suspends normal operation of detector module 600 by suspending the output of pulses from CCU 300 to detector pulse voltage control circuit 700 terminal 734.

The program then moves sequentially through steps 1406, 1407, and 1408 to respectively execute the subroutines SET Q, CALIBRATE, and TEST, which will be explained further hereinbelow.

Step 1404 also conducts the battery test in which CCU 300 sends a logic high signal to terminal 238 of power supply 200 which places the batteries under load for an hour at the end of which CCU 300 reads the battery test voltage on terminal 256 (FIG. 2) to determine whether battery capacity is sufficient to support system 30 in the event of A.C. power failure. The program moves to step 1406 after initiation of the battery test and system 30 continues to operate normally during the battery test.

After steps 1402 or 1408, the program moves to step 1410 which asks whether any power supply troubles exist such as the absence of 120 volt A.C. input, or any supply voltages absent or out of preset limits. If step 1410 is yes, the program moves to step 1412 to store this information in history NVRAM 322.

After steps 1410 or 1412, the program asks in step 1414 whether any battery trouble exists as determined by the battery test. If yes, the program moves to step 1416 to store this information in NVRAM 322.

After steps 1414 or 1416, the program moves to step 1418 which asks whether any ground faults exist in the system wiring. Control panel 32 is operated at a "ground" potential a few millivolts higher than true earth ground. If any of the electrical components of control panel 32 or detector loop 34 become shorted to earth ground, system 30 is conventionally designed to detect this. In such an event, the answer in step 1418 is yes and this information is stored in history NVRAM 322 in step 1420.

After steps 1418 or 1420, the program moves to step 1422 which asks whether any alarm or trouble conditions exist as determined by STARTUP/RESET or previous executions of subroutine MAIN LOOP. If yes, the program moves to step 1424 which asks whether the system audible alarm has been silenced by the depressing the "silence" membrane switch 1114. If no, piezo buzzer 1134 (FIG. 11) is activated in step 1426. If the system has been silenced as determined in step 1424, the program moves to step 1428 to deactivate buzzer 1134.

After steps 1426 or 1428, the program moves to step 1430 which asks whether the number of alarms is greater than zero. If yes, the program moves to step 1432 to activate alarm LED 1126 (FIG. 11) and to display the alarm location on LCD 1102.

If the answer in step 1430 is no, the program moves to step 1434 which asks whether the numbers of troubles is greater than zero. If yes, the program moves to step 1436 to deactivate "normal" LED 1128 (FIG. 11) and to display the trouble condition on LCD 1102.

If the answer in step 1422 is no indicating that there are no alarms or troubles, the program moves to step 1438 to display the notation "SYSTEM OK" on LCD 1102 (FIG. 11).

Figure 18:
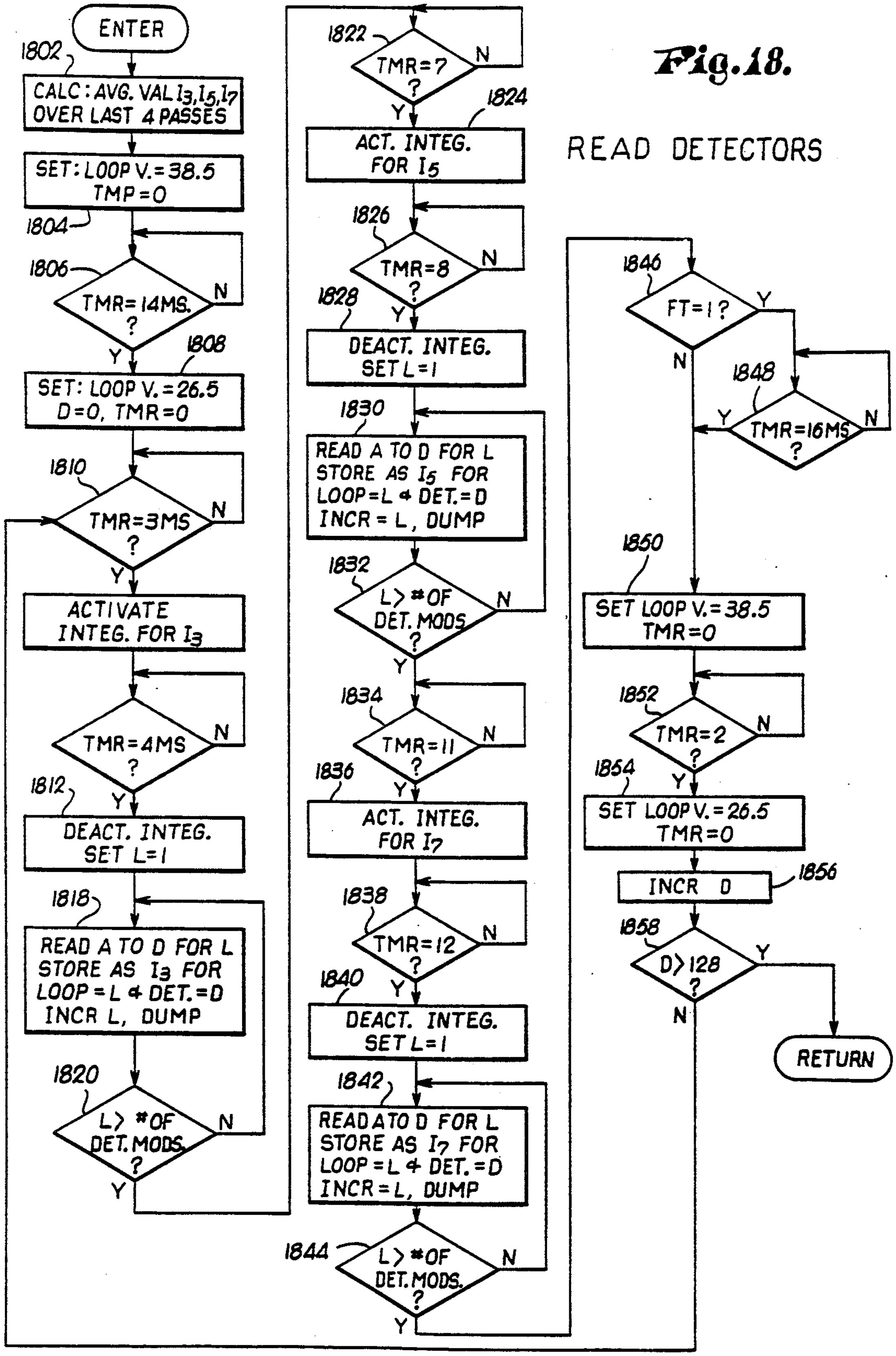
FIG. 18 is a computer program flowchart of the READ DETECTORS subroutine.
Figure 19:
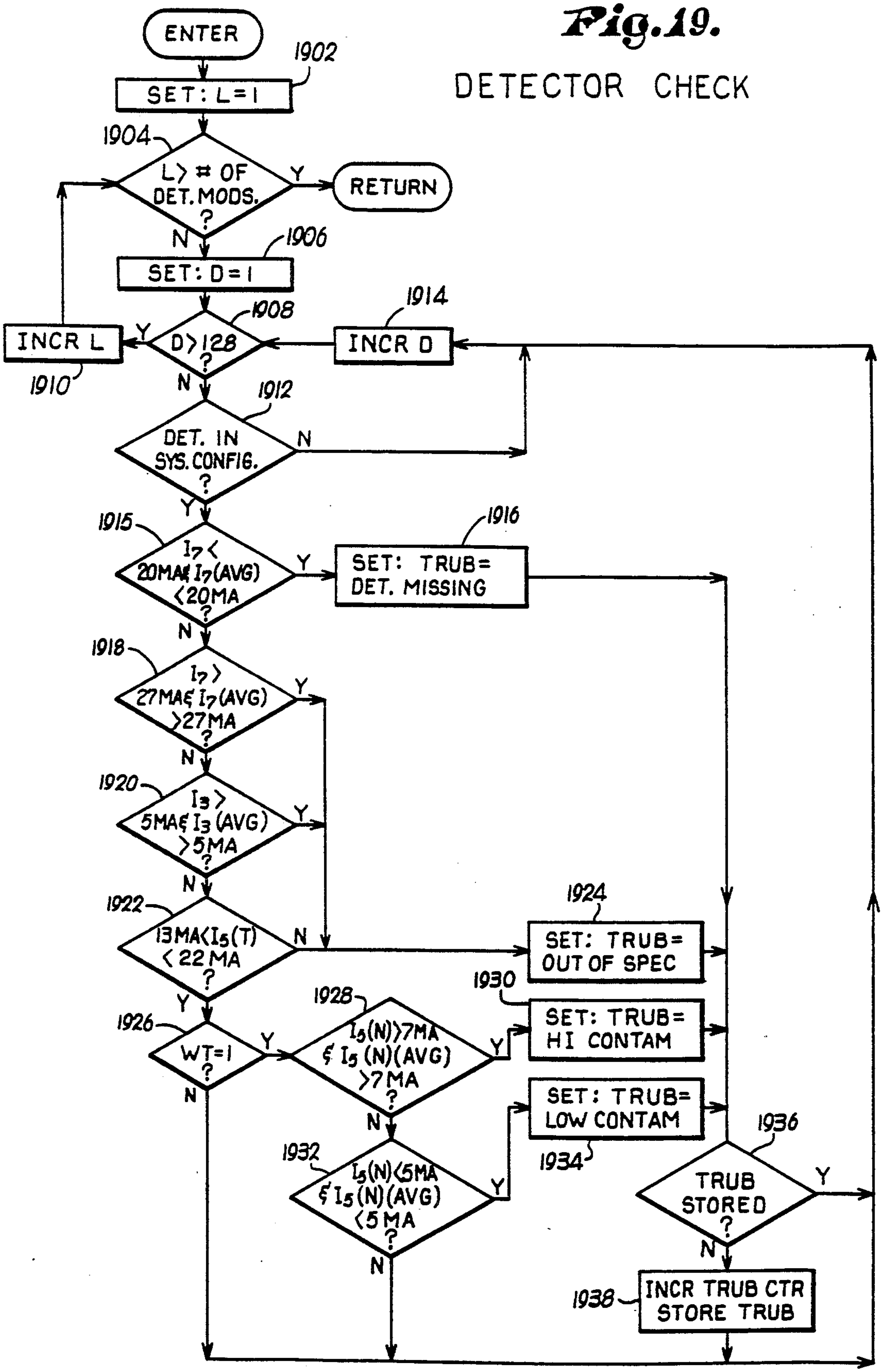
FIG. 19 is a computer program flowchart of the DETECTOR CHECK subroutine.

If the answer in step 1434 is no, or after steps 1438, 1432 or 1436, the program moves to step 1440 to execute the subroutine READ DETECTORS (FIG. 18). In this routine, CCU 300 reads the data from detectors 36. After execution of READ DETECTORS, the program moves to step 1442 (FIG. 14*b*) which asks whether any of membrane switches 1114 are active. If yes, the program moves to step 1444 to read the switch and clears the flag "GP", that is, sets the bit representative thereof to zero.

If no switches are active in step 1442, the program moves to step 1446 which asks whether a short circuit exists in detector loop 34 as stored in system RAM 320 from previous passes. If any detector loop shorts have been detected, the program moves to step 1448 to clear flag "GP". If no detector loop shorts exist, the program moves from step 1446 to step 1450 to set the flag "GP".

Figure 20:
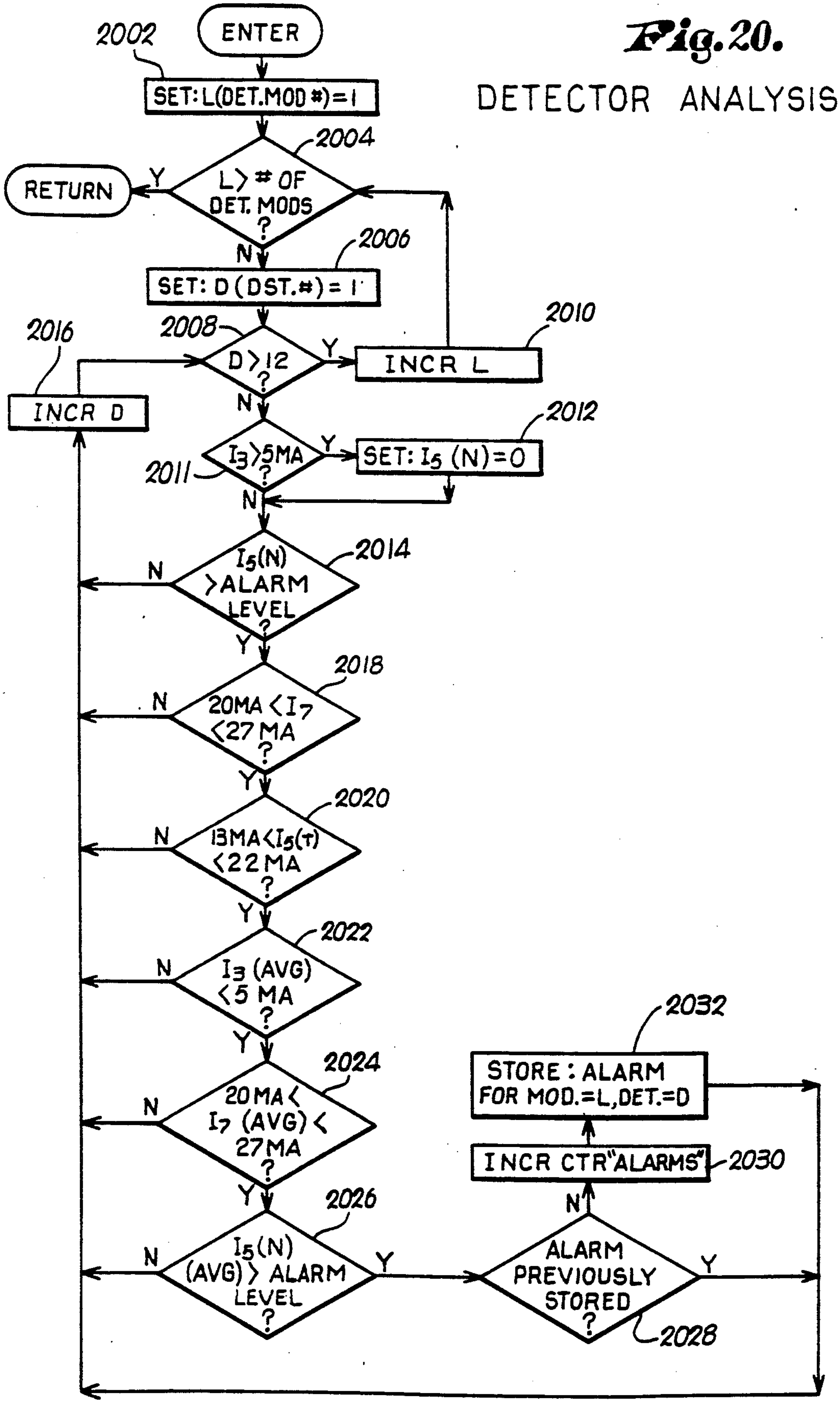
FIG. 20 is a computer program flowchart of the DETECTOR ANALYSIS subroutine.

After steps 1444, 1448 or 1450, the program moves to step 1452 which asks whether flag "GP" is set. If yes, which indicates that no switches are active and no shorts exist, the program moves to step 1454 to sequentially execute the subroutines DETECTOR CHECK (FIG. 19) and DETECTOR ANALYSIS (FIG. 20). As will be explained further hereinbelow, DETECTOR CHECK checks previous detector data stored in system RAM 320 against the preset limits for allowed current magnitudes from detectors 36. DETECTOR ANALYSIS analyzes the data received from the detectors 36 to determine whether an alarm condition exists.

The program then moves to step 1456 which asks whether any new alarm conditions exist as a result of execution of DETECTOR ANALYSIS in step 1454.

If yes, the program moves to step 1458 to clear the flag SYSTEM SILENCE and to acutate buzzer 1134. Thus, for any new alarms, a previous actuation of the "silence" membrane switch 1114 is cleared in order to again actuate buzzer 1134 to announce the existence of a new alarm condition.

If the answer in step 1456 is no, the program moves to step 1460 which asks whether any new troubles exist as a result of step 1454. If yes, the program then moves to step 1458 to clear the flag SYSTEM SILENCE and to actuate buzzer 1134.

Figure 21A:
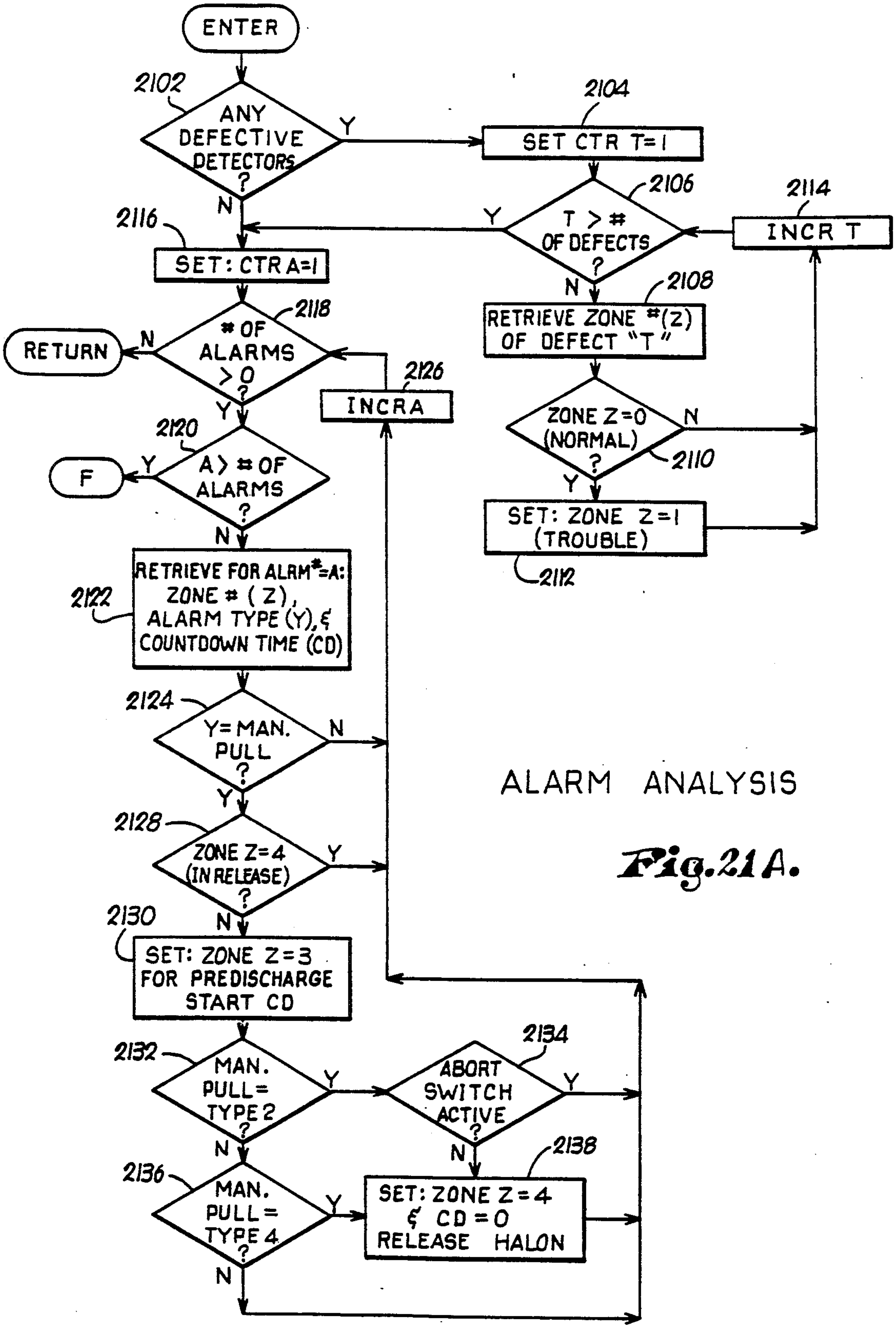
FIG. 21*a* is a computer program flowchart of the first part of the ALARM ANALYSIS subroutine.

If the answer to either of steps 1452 or 1460 is no, or after step 1458, the program moves to step 1462 to execute the subroutine ALARM ANALYSIS (FIGS. 21*a*, *b*, and *c*). In this subroutine, the alarm status of any detectors is analyzed in light of the system configuration as stored in NVRAM 324. For example, if the system is configured with a cross zone protection scheme, the subroutine ALARM ANALYSIS determines whether a detector in each of the respective zones is an alarm as will be further explained.

The program then moves to step 1464 which asks whether the acknowledge membrane switch 1114 is currently active. If yes, the program moves to step 1466 which stores acknowledgement :f the alarm or trouble If the answer in step 1464 is no, or after step 1466, the program moves to step 1468 which activates the correct output via I/O module 500 which may be a remote audible alarm, the release of Halon, or the like as determined by the system configuation. In step 1468, any inputs via I/O module 22 are also read which may correspond to a manual "abort" station which might be manually actuated if a fire has been quickly extinguished, for example.

The program then moves to step 1470 which asks whether any new troubles exist. If yes, the program moves to step 1472 to again clear the flag SYSTEM SILENCE and to activate buzzer 1134.

If the answer in step 1470 is no, the program moves to step 1474 which asks whether any new alarms exist. If yes, the program moves to step 1472 to clear the flag SYSTEM SILENCE and to activate buzzer 1134. If the answer in step 1474 is no, or after step 1472, the program moves to step 1476 in which microprocessor 302 outputs data via serial port interface 304 representative of the alarm data. This data may be advantageously used to actuate a graphics panel (not shown) or other remote devices for determining the location of an alarm condition.

Figure 14A:
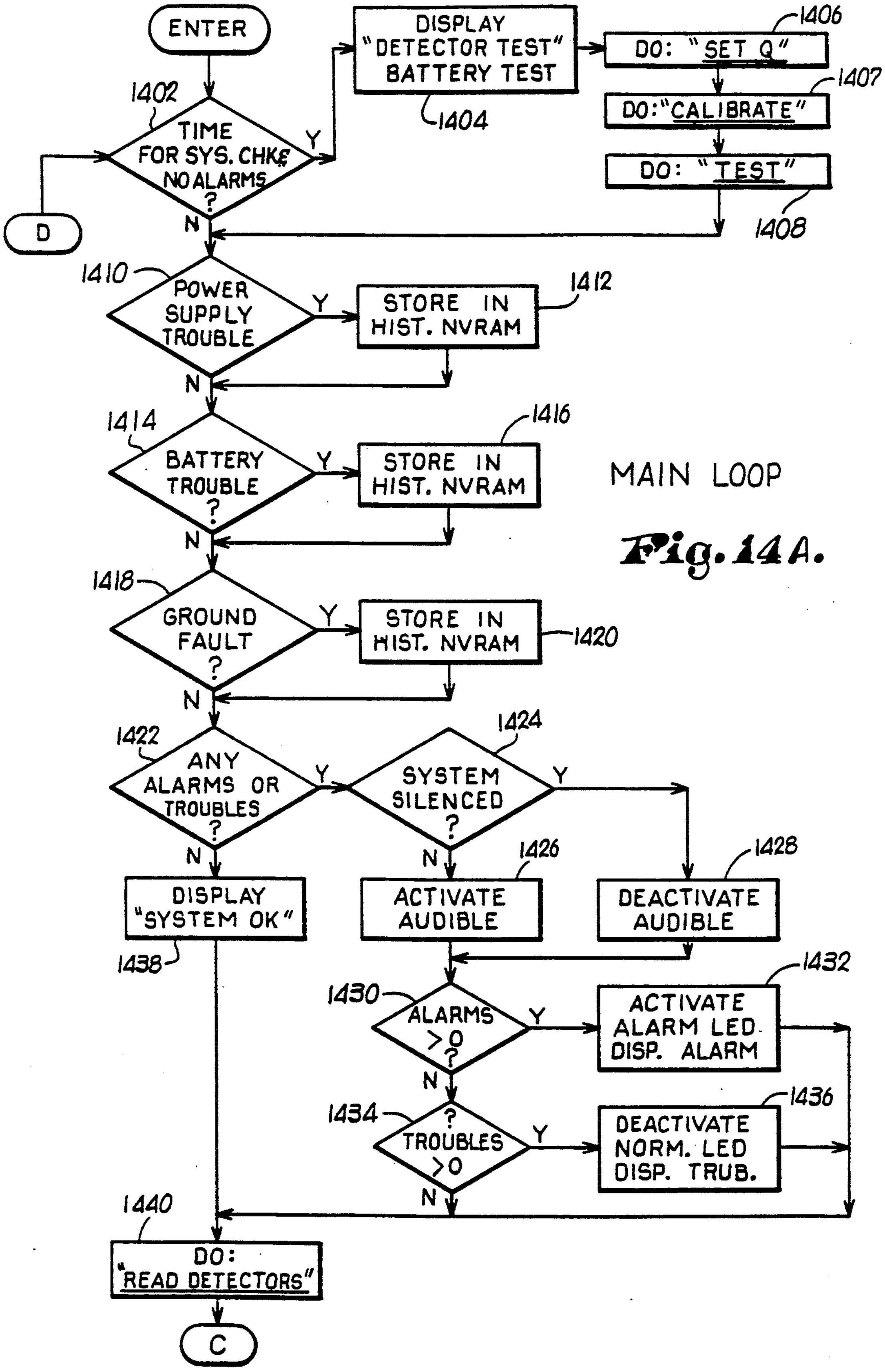
FIG. 14 is a computer program flowchart of the first part of the MAIN LOOP routine.
FIG. 14*b* is a computer program flowchart illustrating the second part of the MAIN LOOP routine.
Figure 14B:
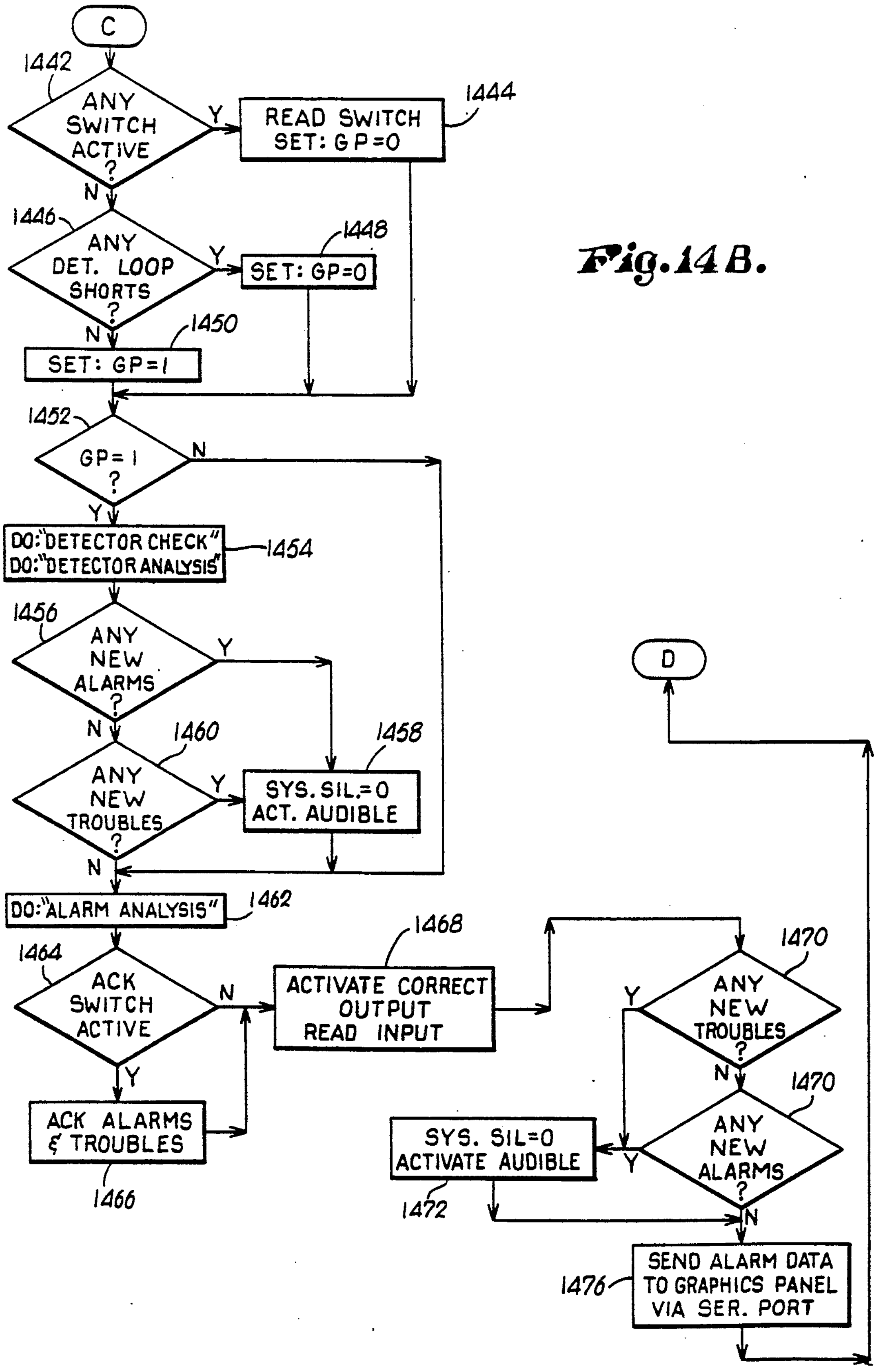

Step 1476 completes routine "MAIN LOOP" and the program loops back to step 1402 (FIG. 14A).

Figure 15:
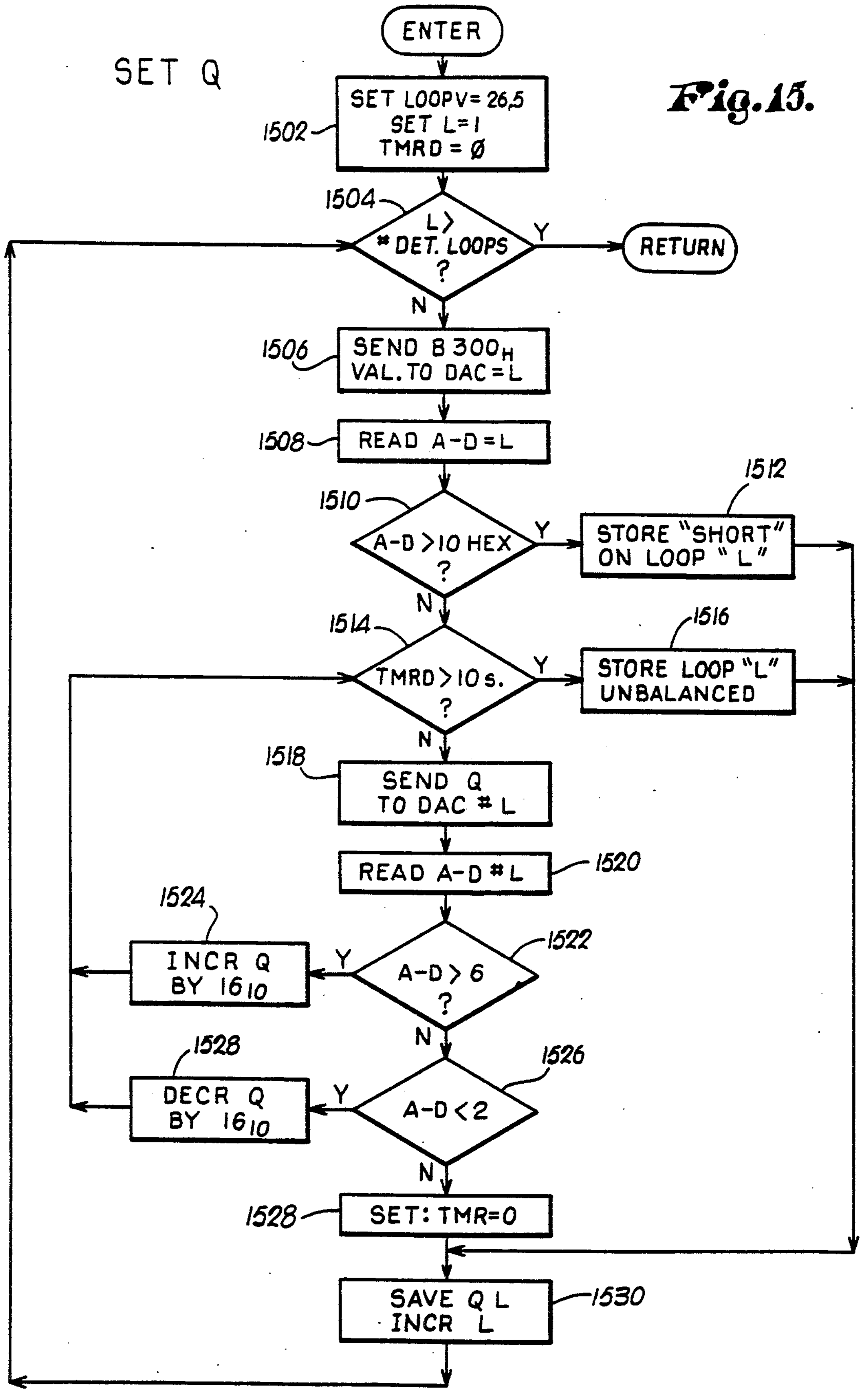
FIG. 15 is a computer program flowchart of the SET Q subroutine.

As mentioned above in connection with subroutines STARTUP/RESET and MAIN LOOP, FIG. 15 illustrates subroutine SET Q which actuates Q current null control circuit 1000 in order to compensate for the quiescent current flowing in detector loop 34. This compensation occurs by successive readings of the quiescent voltage in signal detector circuit 900 and successive increases or decreases in the analog output from DAC 1002 (FIG. 10) as determined by CCU 300.

The program enters subroutine SET Q at step 1502 in which CCU 300 stops sending pulse signals to detector pulse voltage control circuit 700 which in turn produces a steady output voltage on line 602 and thus on detector loop 34 at 26.5 V.D.C. Step 1502 also sets counter "L" (for detector loop number) at 1 and timer "D" at zero.

The program then moves to step 1504 which asks whether L is greater than the number of detector loops.

If the answer in step 1504 is no, CCU 300 sends the value B300 in hexidecimal via I/O bus 328 to DAC 1002 (FIG. 10). This value is sent to the detector module 600 corresponding to L. That is to say, if more than one detector module and thus more than one detector loop are present, this value is sent during this pass through the program to the detector module corresponding to the count on counter L.

The program then moves to step 1508 which reads A/D 928 of signal detector circuit 900 (FIG. 9) corresponding to L. The program then moves to step 1510 which asks whether the digital value received from A/D 928 is greater than 10 hexidecimal. If yes, this indicates a higher than normal current flow through detector loop 34 which in turn indicates a short circuit in the wiring of detector loop 34. Data representative of this fact is then stored in NVRAM 322.

If the answer in step 1510 is no, the program moves on to step 1514 which asks whether the elapsed time as indicated by timer D exceeds ten seconds. Ten seconds is more than sufficient time for an allowable number of iterations to compensate for the quiescent current. If such is not possible in ten seconds, then a defect or anamoly is indicated which prevents compensation of the quiescent current, that is, which indicates that the detector loop is unbalanced. Step 1516 stores this information in NVRAM 322.

If the answer in step 1514 is no, the program moves to step 1518 in order to begin the iteration process for compensating for the quiescent current flow in detector loop 34. Initially the variable Q is set to zero and CCU 300 sends the Q value in digital form via I/O bus 328 to DAC 1002. As a result, DAC 1002 initially produces an output log value of 0 which provides no balancing or offset value at terminal 606.

The program then moves to step 1520 and reads the quiescent voltage at terminal 606 (FIG. 9) as provided to to terminal CH1 of A/D 928 (FIG. 9) and converted thereby to a digital output value representation thereof on I/O bus 328.

The program then moves to step 1522 which asks whether the output value from A/D 928 exceeds decimal 6. If yes, this indicates that quiescent current null control circuit 1000 (FIG. 10) is not allowing sufficient current flow through transistor 1022 to offset the effects of the quiescent current flow in detector loop 34. Accordingly, the program moves to step 1524 which increments variable Q in binary equivalent to decimal 16. The program then loops back to step 1514, sends the new value of Q to DAC 1002 which in turn produces a new compensating current through transistor 1022. CCU 300 then reads the new output value from A/D 928 in step 1520 and moves again to step 1522. This process continues until the quiescent voltage on terminal 606 as read from A/D 928 is no longer greater than decimal 6.

If the answer in step 1522 is no, the program moves to step 1526 which asks whether the output value from A/D 928 is less than decimal 2. If yes, the program moves to step 1528 to decrement Q by decimal 16 and loops back to step 1514. This process continues until the quiescent voltage output value received from A/D 928 is longer less than 2.

In the event that incrementing Q by decimal 16 produces a quiescent voltage value greater than decimal 6 and decrementing Q producing a quiescent voltage value less than 2, then the program continues to loop through step 1514 until ten seconds has elapsed which indicates that it is not possible to properly compensate for the quiescent current flow in detector loop 34 in which case the answer in 1514 is yes.

During normal operation, however, the quiescent voltage value produced by A/D 928 is adjusted between decimal 2 and decimal 6 and the program moves from step 1526 to step 1528 which resets the timer D to zero. After step 1528 or after steps 1512 or 1516, the program moves to step 1530 which stores the value of Q in system RAM 320 for detector loop L.

The program then loops back to step 1504 to execute steps 1504–1530 for the next sequential detector loop and detector module if more than one of each are included in the system. In step 1504, when L exceeds the number of detector loops present in the system, the answer in step 1504 is yes and the program returns.

Subroutine CALIBRATE calibrates the detectors in order to compensate for the effects of accumulated dust on the detectors, age of the detector components, and the like. That is to say, the analog current signals received from the detectors tend to drift over time and subroutine CALIBRATE compensates for this drift. More particularly, this subroutine reads state $I_5(N)$ which represents the normal ambient magnitude of the environmental condition parameter being measured which, in the preferred embodiment, is smoke obscuration. CALIBRATE then activates the test LED in each detector which then produces a signal $I_5(T)$ in place of $I_5(N)$ representative of a reference magnitude of the parameter which in the preferred embodiment is 4.5% smoke obscuration.

A sensitivity value for each detector is stored in the system configuration file and CALIBRATE calculates a threshold alarm value as a function of this sensitivity and as a function of $I_5(N)$ and $I_5(T)$. In other words, CALIBRATE determines the ambient smoke obscuration which during execution is assumed to be 0 and determines the reference obscuration at 4.5% per meter. These two values then define a linear response curve for each detector which, when used in combination with the sensitivity data, produce a threshold alarm level for each detector. Calibration ensures that the detectors respond uniformly to ambient conditions despite individual differences.

Subroutine CALIBRATE enters at step 1602 which sets the counter L at 1. The program then moves to step 1604 which asks whether L is greater than the number of detector modules and thus detector loops connected to the system. If no, the program moves to step 1606 to display the notation "CHECK FIRE LEVELS" on LCD 1102 which indicates that the detectors are being calibrated.

The program then moves to step 1608 which retrieves the sensitivity value "S" from system configuration NVRAM 324 for each detector in loop L.

The program moves to step 1610 which sets the flag "FT" equal to 0. The program then executes the subroutine "READ DETECTORS" (FIG. 18) twenty times. This program is executed twenty times in order to allow time for the detectors to stabilize thus ensuring representative data therefrom. The value for $I_5(N)$ retrieved during execution of "READ DETECTORS" is then stored for later use. The stored value for $I_5(N)$ represents the ambient obscuration level which during the test is assumed to be "normal" since no alarms are occuring.

The program then moves to step 1612 which sets flag FT equal to 1. This flag is used in subroutine "READ DETECTORS" in order to space out the interval between voltage pulses to 16 milliseconds as discussed in connection with FIG. 12. Subroutine "READ DETECTORS" is then executed twice because two voltage pulse intervals at 16 millisesonds are required in order to activate the test LED in each detector 36. The LED's remain active until a single interval between pulses of 16 milliseconds is received which occurs later in the program.

The program then moves to 1614 which clears flag FT and then to step 1616 which again executes "READ DETECTORS" twenty times while the test LED's are active within each detector. By executing "READ DETECTORS" twenty times, sufficient times is allowed for the output value to state 5 to stabilize. With the test LED's active, this state 5 value is designated as $I_5(T)$ which indicates the state 5 test value.

The program then moves to step 1618 to perform the calculation as shown in order to calculate the value for the variable "X" for each detector in step 1620.

The program then moves to step 1620 to perform the second part of the calculation as shown in order to produce the value "T" which is the threshold value as a function of sensitivity "S", $I_5(N)$, $I_5(T)$, and $I_3$. The $I_3$ value represents the steady state current draw of the particular detector. The threshold T is calculated for each detector in loop L and stored in system RAM 320. The threshold for a given detector is that level of obscuration indicating that an alarm condition exists in the area of the detector.

The program then moves to step 1622 in order to deactivate the test LED's in the individual detectors. To accomplish this, flag FT is set and the subroutine "READ DETECTORS" executed once. By so doing, a single voltage pulse interval at 16 milliseconds is imposed on detector loop 34 which deactivates the test LED's. Flag FT is then cleared.

The program then moves to step 1624 which increments L and clears LCD 1102 after which the program loops to step 1604 to determine whether counter "L" exceeds the number of detector modules and corresponding detector loops. If yes, the program exits CALIBRATE.

Figure 17:
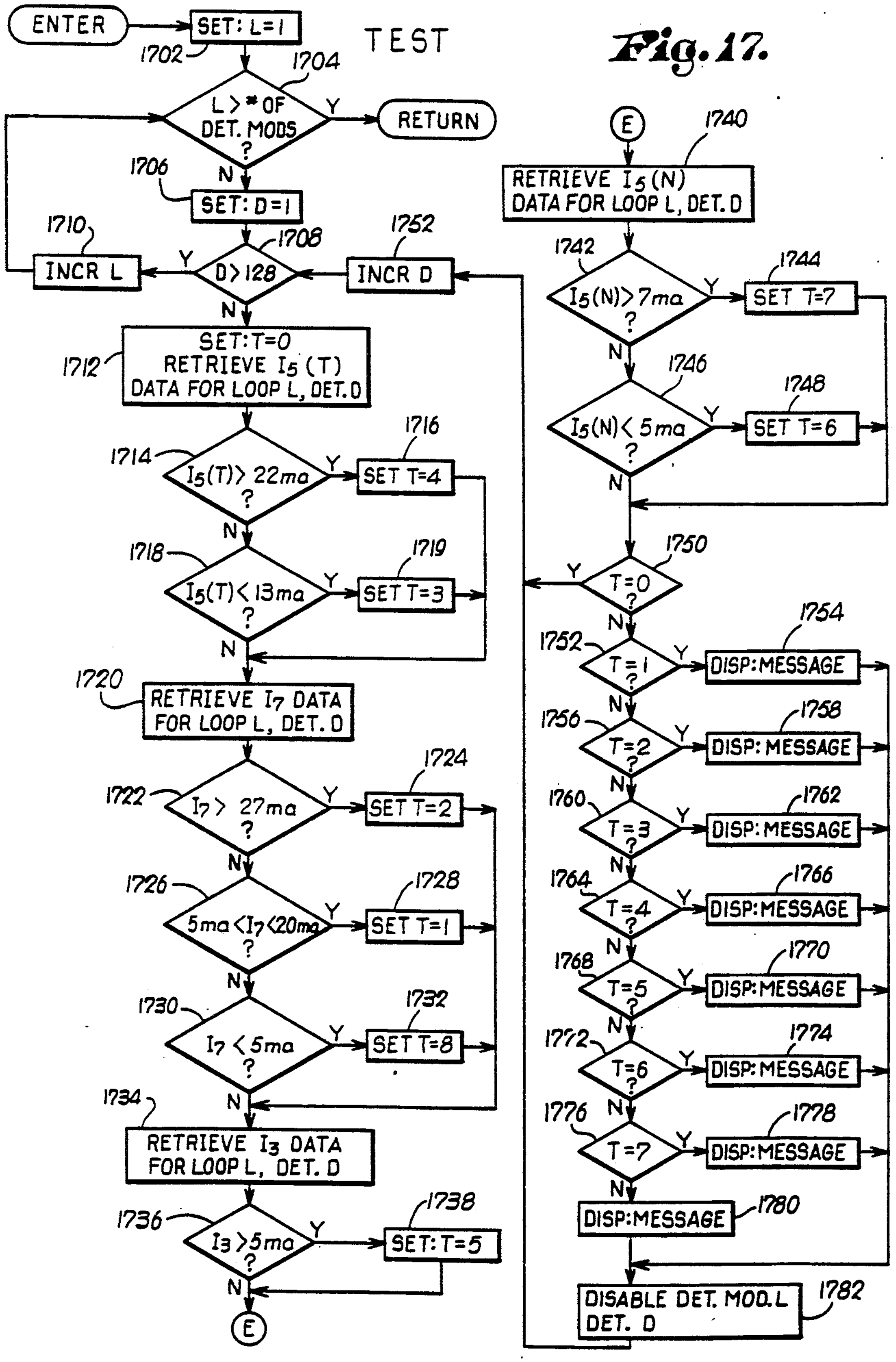
FIG. 17 is a computer program flowchart of the TEST subroutine.

FIG. 17 illustrates subroutine TEST which analyzes the state data $I_3$, $I_5(N)$, $I_5(T)$, and $I_7$ to determine whether the values thereof are outside predetermined limits which would indicate an anomaly or defect associated with a given detector. The program enters at step 1702 which sets L at 1 for the first detector loop. The program then moves to step 1704 which asks whether L is greater than the number of detector loops and associated modules. If no, the program moves to step 1706 which sets D at 1 in order to test the state data for the first detector in each loop.

The program then moves to step 1708 which asks whether D is greater than 128. If yes, this indicates the state data for all detectors D in each loop L have been analyzed and the program moves to step 1710 which increments L and then loops to step 1704.

If the answer in step 1708 is no, the program moves to step 1712 which sets counter T to zero and retrieves the $I_5(T)$ data for loop L, detector D. Counter T acquires a value in later steps corresponding to the type of trouble associated with the test detector.

The program then moves to step 1714 which asks whether the $I_5(T)$ data indicates a current flow greater than 22 milliamps. A current flow through a detector greater than 22 milliamps when the test LED is activated is outside acceptable limits for a normal detector 36 and if such is the case, the program moves to step 1716 to set T equal to 4.

If the answer in step 1714 is no, the program moves to step 1718 which asks whether the value for $I_5(T)$ is less than 14 milliamps. If yes, this is below acceptable limits and the program moves to step 1719 to set T equal to 3.

After steps 1716, 1718 or 1719, the program moves to step 1720 to retrieve the $I_7$ data for detector D of loop L. State $I_7$ identifies the type of detector connected to the loop. If a detector is operating normally, the $I_7$ analog current flow will be between 20 and 27 milliamps and a current level outside this range is indicative of abnormal operation. Accordingly, the program first asks in step 1722 whether $I_7$ exceeds 27 milliamps. If yes, the program moves to step 1724 and sets T equal to 2.

If the answer in step 1722 is no, the program moves to step 1726 which asks whether $I_7$ is greater than 5 milliamps but less than 20 milliamps. If yes, which is outside the acceptable operating range, the program moves to step 1728 to set T equal to 1.

If the answer in step 1726 is no, the program moves to step 1730 which asks whether $I_7$ is less than 5 milliamps. If yes, the program moves to step 1732 to set T equal to 8.

If the answer to step 1730 is no, or after steps 1724, 1728, or 1732, the program moves to step 1734 which retrieves the $I_3$ data for detector D of loop L. State $I_3$ data represents the normal current draw of a detector and should be below 5 milliamps. Step 1736 asks whether $I_3$ exceeds 5 milliamps, and if yes the program moves to step 1738 to set T equal to 5.

If the answer in step 1736 is no, or after step 1738, the program moves to step 1740 to retrieve the $I_5(N)$ data for detector D of loop L. State $I_5(N)$ represents the sensed magnitude of smoke obscuration and should fall between 5 and 7 milliamps for a normally operating detector. Accordingly, step 1742 asks whether $I_5(N)$ exceeds 7 milliamps. If yes, the program moves to step 1744 to set T equal to 7.

If the answer in step 1742 is no, the program moves to step 1746 which asks whether $I_5(N)$ is less than 5 milliamps. If yes, the program moves to step 1748 to set T equals 6.

If the answer in step 1746 is no or after step 1748, the program moves to step 1750 which asks whether T equals 0. Counter T was initially set at 0 in step 1712, and if no detector anomalies were detected, is still set at 0 and the program accordingly moves to step 1752 to increment D in order to test the data for the next detector and then loops to step 1708.

If any of the current level tests in steps 1714–1736 indicated a current level outside the acceptable limits, the answer in step 1750 is no and the program displays an appropriate message for the specific type of trouble as indicated by the value for counter T. As shown in FIG. 17, the program in step 1752–1780 tests indicator T for values 1–7 and if yes displays the appropriate message indicative of the particular trouble. For example, if T equals 5, an appropriate message for display on LCD display 586 such as "HIGH REFERENCE CURRENT—DETECTOR 1, MODULE 1" might be displayed. If the answer in step 1776 is no, then T must equal 8 and a corresponding message is activated in step 1780. After steps 1752–1780, the program moves to step 1782 which sets an appropriate flag indicating that detector D of loop L is defective which thereby disables that detector from initiating an alarm condition. The program then loops to step 1752 to increment D for the next detector in the loop.

FIG. 18 illustrates subroutine READ DETECTORS during which detector module 600 generates voltage pulses at normal 12 millisecond intervals (see FIG. 12) for reception by the detectors 38. After a voltage pulse corresponding to the appropriate detector, that detector produces the sequential analog current signals corresponding to the various "states" the corresponding values of which are read by CCU 300 and stored.

Subroutine READ DETECTORS enters at step 1802 which calculates the average value of the detector "states" $I_3$, $I_5$(N), $I_5$(T), and $I_7$ over the last four passes through this routine.

The program then moves to step 1804 to set the detector loop voltage at 38.5 volts. In other words, CCU 300 sends out a logic high signal which is received by detector pulse voltage control circuit 700 (FIG. 7) at terminal 734 which causes regulator 326 to increase the output voltage from 26.5 volts to 38.5 volts on line 602 for as long as the signal exists at terminal 716. Step 1804 also sets a timer TMR equal to 0.

The program then pauses in step 1806 for 14 milliseconds which holds the output voltage from regulator 706 at 38.5 volts for this amount of time and moves to step 1808 to set the voltage back to 26.5 V.D.C. As illustrated in FIG. 12, this 14 millisecond voltage pulse is a reset pulse which resets all of the pulse counters in detectors 36. Step 1808 also sets counter D to zero and TMR to zero.

The following steps of READ DETECTORS are designed to produce the 2 millisecond voltage pulses as illustrated in FIG. 12 which polls the detector corresponding to the total pulse count since the last reset pulse. The detectors increment their internal pulse counters upon sensing the leading edge of the voltage pulse and the addressed detector begins producing analog current signals beginning 1 millisecond later while the 2 millisecond pulse is still present. However, during the first pass through READ DETECTORS, which occurs during the twelve millisecond interval after the reset pulse, no detectors have been polled and as a result no data is transmitted during this period. At the end of the first pass, however, the first 2 millisecond pulse is produced and the first or No. 1 detector responds by sending seven analog current signals lasting 2 milliseconds each. In the preferred embodiment, however, only states $I_3$, $I_5$, and $I_7$ are of interest and the data from the other states is not read or used.

After step 1808, the program moves to step 1810 to wait until timer TMR equals 3 milliseconds after which, in step 1812, the integrate signal is sent to terminal 938 (FIG. 9) to integrate the analog voltage representative of the analog current signal. The program then moves to step 1814 to wait until timer TMR equals 4 milliseconds (i.e., a 1 millisecond pause after step 1810). The program moves to step 1816 to deactivate the integrate signal and to set L to 1 corresponding to the first detector loop.

The program then moves to step 1818 during which CCU 300 reads the digital data on I/O bus 328 from A/D 928 which represents the integrated voltage level on the output from amplifier 946 existing after the integrate signal went low on terminal 938. This digital value is stored as representative of state $I_3$ which corresponds to the reference current level or state current level flowing through the polled detector. During the first pass through the program, variable D equals 0 which does not correspond to an actual detector. Step 1818 also increments counter L and "dumps" the integrated voltage by sending a momentary "dump" signal to terminal 958 (FIG. 9).

The program then moves to step 1820 which asks whether L is greater than the number of detector modules. During the first pass L equals 1, the program loops to step 1818 to read A/D 928 for the next detector loop, if any.

When the $I_3$ value for detector D for each loop has been read, the answer to step 1820 is yes and the program moves to step 1822 to wait until timer TMR equals 7, that is, until 3 additional milliseconds have elapsed since step 1814 and then moves to step 1824 wherein CCU 300 again sends an integrate signal to terminal 938.

The program then moves to step 1826 to integrate for one millisecond until timer TMR equals 8 and then moves to step 1828 to deactivate the integrate signal and to set L equal to 1.

The program then moves to step 1830 to read A/D 928 and to store the digital value therefrom as $I_5$. Normally, $I_5$ represents the magnitude of ambient smoke obscuration in the vicinity of the detector being polled, that is, $I_5$(N). In the event the test LED in each detector has been activated, $I_5$ represents the test level $I_5$(T) for 4.5% obscuration. Step 1830 also increments L and sends the "dump" signal to terminal 958.

The program then moves to step 1832 which asks whether L exceeds the number of detector modules. If not, the program loops to step 1830 to repeat for the next detector loop.

When the answer in step 1832 is yes, the program moves to step 1834 to wait for 3 milliseconds until timer TMR equals 11 milliseconds after which the program moves to step 1836 to again send the integrate signal to terminal 938.

The program pauses in step 1838 to integrate for one millisecond until timer TMR equals 12 at which point the program moves to step 1840 to remove the integrate signal and to set L equal to 1.

In step 1842 the program reads A/D 928 and stores the digital value received therefrom as state $I_7$ for loop L and detector D. The program then increments L and sends the "dump" signal to terminal 958. The program then moves to step 1844 and loops back to step 1842 until state $I_7$ for detector D has been read for each loop.

After step 1844 the program moves to step 1846 which asks whether the flag FT is set. As discussed above in connection with subroutine CALIBRATE (FIG. 16), flag FT is set whenever it is desired to activate the test LED in each detector. The test LED is activated by producing two successive intervals between voltage pulses at 16 milliseconds. Accordingly, if flag FT is set, that is . equal to 1, the program moves to 1848 to wait until timer TMR equals 16 milliseconds after which the program moves to step 1850 when CCU 300 sends a logic high signal to terminal 734 (FIG. 7) which causes regulator 706 to increase output to 38.5 volts. Step 1850 also resets timer TMR to 0.

The program then moves to step 1852 to wait until timer TMR equals 2 milliseconds to provide a 2 millisecond voltage pulse at 38.5 V.D.C. The program then moves on to step 1854 to set voltage from regulator 706 back down to 26.5 V.D.C. Timer TMR is also reset to 0. The program then moves to step 1856 to increment D for the next detector in the detector loops.

Step 1858 asks whether D exceeds 128 which indicates that all of the detectors have been polled and read. If yes, the program exits subroutine READ DETECTORS. If no, the program loops to step 1810 to read the $I_3$, $I_5$, and $I_7$ analog current levels for each detector D.

When the subroutine again reaches step 1846 and flag FT is still set, the program again waits in step 1848 until timer TMR equals 16 milliseconds. This second interval of 16 milliseconds between voltage pulses activates the test LED within each detector.

As discussed above, flag FT is set only when subroutine CALIBRATE is being executed. If this is not the case, the program moves directly from step 1846 to 1850 in order to produce the 38.5 V.D.C. pulse after an interval of only 12 milliseconds (refer to step 1838). If this is the first pass through read detector, steps 1850–1854 produce the first voltage pulse, step 1856 increments D from 0 to 1, and detector No. 1, whose counter is set to activate upon reception of the first voltage pulse, is polled thereby. The polled detector sends its first state beginning 1 millisecond after the rising edge of the voltage pulse, that is, 1 millisecond after step 1850.

Referring to FIG 12, 3 milliseconds after the voltage pulse (that is, 3 milliseconds after step 1854) marks the beginning of state $I_3$. And the integrate signal is sent to terminal 938 (FIG. 9) to begin the integration process. The integration signal goes low at a count of 4 milliseconds which is midway through the $I_3$ state. CCU 300 then reads the data from A/D 928 at the end of which the logic high dump signal is sent to terminal 958 to discharge capacitor 948 (see step 1818). The integrate read and dump process is repeated for $I_5$ (steps 1822–1830) and $I_7$ (steps 1834–1842) and continues until all of the state data from all of the detectors have been read and stored.

Subroutine TEST is executed during power up, or whenever microprocessor 302 is reset either manually by "reset" membrane switches 114 or automatically if watchdog 308 times out. Additionally, subroutine TEST is executed on a periodic basis which in the preferred embodiment is once a week. During the weekly check of the system, subroutine CALIBRATE is also executed through which the test LED is in each detector is activated to generate a new set of $I_5(T)$ data.

In order to improve the reliability of system 30, subroutine DETECTOR CHECK (FIG. 19) is provided which is executed during each pass through MAIN LOOP 34. DETECTOR CHECK analyzes the state data from each detector in a manner similar to subroutine TEST in order to determine the presence of a defective detector during an interval between the weekly system checks.

Subroutine DETECTOR CHECK enters at step 1902 which sets counter L equal to 1 corresponding to the first detector loop. Step 1904 asks whether L is greater than the number of detector modules. If no, the program moves to step 1906 which sets counter D equal to 1 corresponding to the first detector of loop L.

The program then moves to step 1908 which asks whether D is greater than 128. If yes, this indicates that all of the detectors in loop L have been checked and the program moves to step 1910 to increment L in order to check detectors of the next detector loop and then loops to step 1904.

If the answer in step 1908 is no, the program moves to step 1912 which asks whether detector D of loop L is defined in the system configuration. For example, even though a detector loop can include up to 127 detectors, the system as configured may not include that many detectors and accordingly a corresponding detector may not exist. If such is the case, there is no data to analyze, the answer in step 1912 is no, and the program loops to step 1914 to increment D and then loop to step 1908.

If the answer in step 1912 is yes, the program moves to step 1915 to check state $I_7$ for detector D. Additionally, the program also checks the average of the $I_7$ data over the last four readings. Accordingly, step 1915 asks whether the most recent $I_7$ data is less than 20 milliamps and whether the average $I_7$ over the last four passes is also less than 20 milliamps. By testing both—the most recent reading and the average reading—system 30 assures that a spurious $I_7$ reading does not cause a trouble indication.

If the answer in step 1915 is yes, the program moves to step 1916 to set the trouble indication that particular detector is missing. That is to say, the $I_7$ data should never be less than 20 milliamps using the preferred detectors. Accordingly, if the $I_7$ current is less than 20 milliamps, then the detector has somehow become electrically disconnected from the system.

If the answer in step 1915 is no, the program moves to step 1918 which asks whether both the most recent $I_7$ data and the average $I_7$ data are both greater than 27 milliamps and thereby out of specification.

If step 1918 is no, the program moves to step 1920 which asks whether the most recent $I_3$ data and the average $I_3$ data are both greater than 5 milliamps. If no, the program moves to step 1922 which asks whether the $I_5(T)$ data as determined in the most recent execution of subroutine CALIBRATE, is above 13 milliamps but less than 22 milliamps. If the answer in step 1922 is no, or if the answer to steps 1918 or 1920 is yes, the program moves to step 1924 to store data indicative that detector D is beyond specified limits.

If the answer in step 1922, the program moves to step 1926 which asks whether the flag WT is set. If the answer in step 1926 is yes, the program moves to step 1928 which asks whether the most recent $I_5(N)$ current and average $I_5(N)$ current are both greater than 7 milliamps. If yes, this indicates contamination of the detector causing high current levels and step 1930 provides this indication.

If the answer in step 1928 is no, the program moves to step 1932 which asks whether both the most recent $I_5(N)$ and average $I_5(N)$ currents are less than 5 milliamps. If yes, contamination causing low current outputs as indicated and such is provided in step 1934. If the answer in either steps 1926 or 1932 is no, the program loops to step 1914.

After steps 1916, 1924, 1930, or 1934 which all indicate the existence of a trouble, the program moves to step 1936 which asks whether these troubles have been previously stored in history NVRAM 322. If yes, the program loops to step 1914. If no, the program moves to step 1938 which increments the trouble counter and stores information indicative of the trouble in history NVRAM 322. The program then loops to step 1914.

When all detectors in loop L have been checked as indicated by a yes answer in step 1908, the program increments L and loops to step 1904. When all detectors and all the loops have been checked as indicated by a yes answer in step 1904, the program exits DETECTOR CHECK.

FIG. 20 illustrates DETECTOR ANALYSIS which analyzes the data from each detector as read in READ DETECTORS to determine whether an alarm condition is indicated for each respective detector. DETECTOR ANALYSIS enters at step 2002 which sets counter L equal to 1. The program then moves to step 2004 which asks whether L is greater than the number of detector modules. If no, the program moves to step 2006 which sets counter D equal to 1.

Step 2008 asks whether D is greater than 128 which, if yes, the program moves to step 2010 to increment L and loop to step 2004.

If the answer in step 2008 is no, the program moves to step 2011 which asks whether $I_3$ for detector D of loop L is greater than 5 milliamps. State $I_3$ represents the normal current draw of detector D and should not exceed 5 milliamps. If the answer in step 2011 is yes, the program moves to step 2012 which sets $I_5(N)$ at 0 to prevent this detector from indicating an alarm condition.

Figure 16:
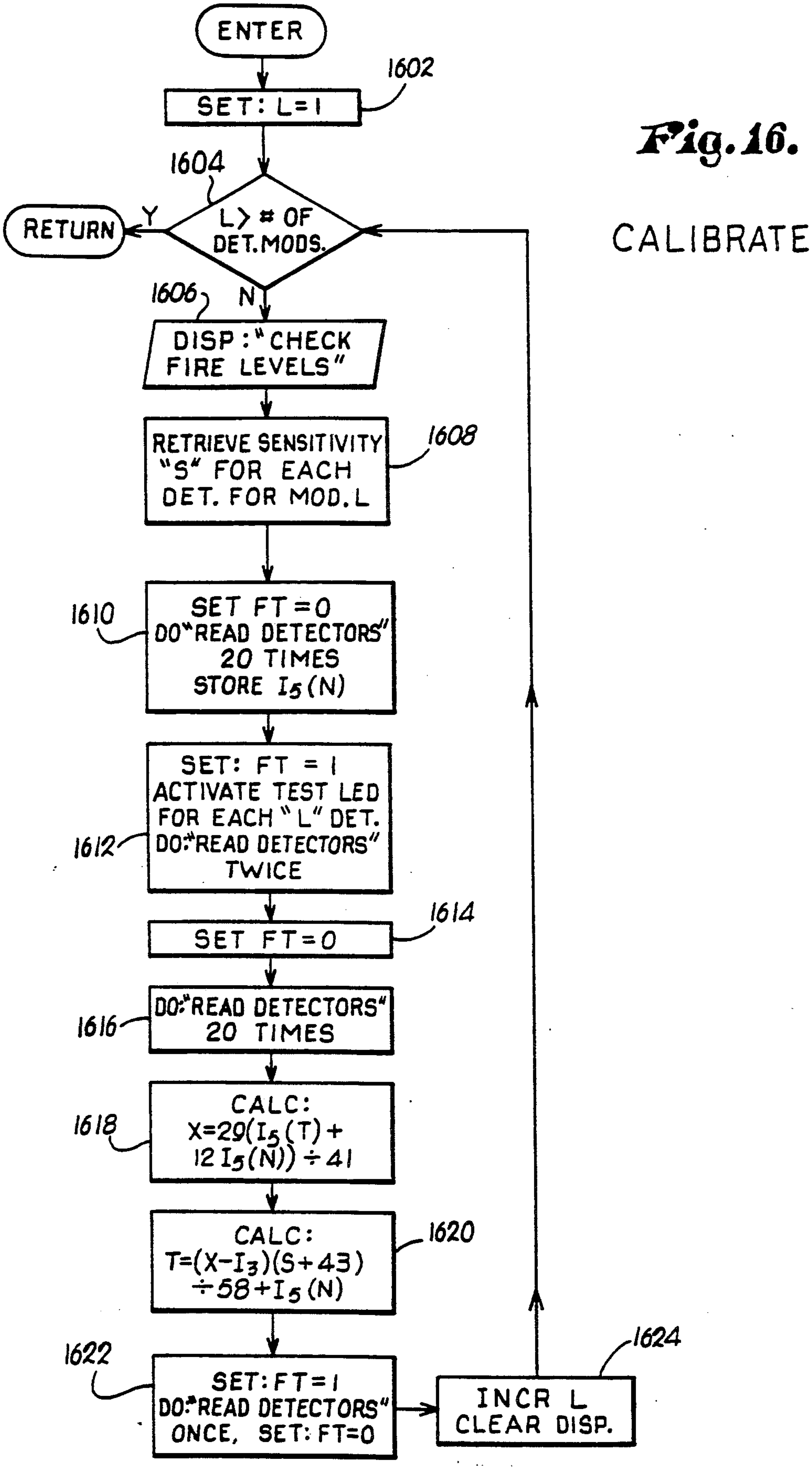
FIG. 16 is a computer program flowchart of the CALIBRATE subroutine.

If the answer in step 2011 is no, or after step 2012, the program moves to step 2014 which asks whether $I_5(N)$ is greater than the alarm level, that is, greater than the threshold level T as determined by the previous execution of subroutine CALIBRATE (FIG. 16).

If the answer in step 2014 is no, then detector D is not in an alarm condition, that is, the smoke obscuration as detected thereby is not above the threshold level, and the program moves to step 2016 to increment D and then to loop to step 2008.

If the answer in step 2014 is yes, indicating the existence of an alarm condition for detector D, the program moves to step 2018 which asks whether identification state $I_7$ is greater than 20 milliamps and less than 27 milliamps. If no, $I_7$ is not within acceptable limits and the program loops to step 2016.

If the answer in step 2018 is yes, the program moves to step 2020 which asks whether the LED test current level $I_5(T)$ is greater than 13 milliamps but less than 22 milliamps. If no, the program loops to step 2016. If yes, indicating that this current is within acceptable limits, the program moves to step 2022 which asks whether the average $I_3$ over the last four passes is less than 5 milliamps. If no, the program loops to step 2016. If yes, the program moves to step 2024 which asks whether the average $I_7$ over the last four passes is greater than 20 milliamps but less than 27 milliamps. If no, the program loops to step 2016.

If step 2024 is yes, the program moves to step 2026 which asks whether the average of $I_5(N)$ over the last four passes is above the threshold level. This step is provided to ensure that a spurious alarm level reading is not sufficient to cause an alarm condition. Thus, not only must the most recent $I_5(N)$ state be above the alarm thresh old, but so must the average of the last four passes.

Accordingly, if the answer in step 2026 is no, the program loops to step 2016. If yes, the program moves to step 2028 which asks whether an alarm condition for detector D of loop L has been previously determined and stored. If yes, the program loops to step 2016. If no, the program moves to step 2030 which increments the alarm counter indicative of the total number of detectors in an alarm condition and then moves to step 2032 to store information in history NVRAM 322 indicating that detector D of loop L is in alarm condition. The appropriate real time of this condition is also stored.

The program then loops to step 2016 and then to step 2008 to test the data for the other detectors in loop L. When all of the detector data have been analyzed, the answer in step 2008 is yes, the program increments L in 2010 and to then loops to step 2004. When all of the detector loops in the system have been analyzed, the answer in step 2004 is yes and the program exits subroutine DETECTOR ANALYSIS.

FIGS. 21A, B, and C illustrate subroutine ALARM ANALYSIS which determines whether those detectors in an alarm condition satisfy the alarm scheme defined by the system configuration stored in NVRAM 324. That is to say, if the cross zone scheme is used, a single detector or even a plurality of detectors in alarm condition in only one zone are not sufficient to indicate a system alarm. The preferred cross zone alarm scheme acquires that at least one even-numbered detector and one odd-numbered detector from a given zone be in alarm condition in order to release a fire suppressant agent such as Halon. In a single release scheme only one detector need be an alarm to activate a system alarm and in the verified scheme, two detectors from one zone must be in an alarm condition in order to place the system in alarm.

The first portion of subroutine ALARM ANALYSIS as illustrated in FIG. 21A, analyzes the status of manual pull stations which a fire protection scheme may incorporate to place the system in alarm. Furthermore, the preferred system includes an abort switch which may be prevent the release of Halon for certain ones of the manual pull stations which are defined as Type 2 manual pull stations. In contrast, a Type 4 manual pull station when initiated does not allow an abort switch to prevent release of Halon.

ALARM ANALYSIS enters at step 2102 (FIG. 21A) which initially asks whether any detectors are defective or in a trouble condition as determined by subroutine TEST (FIG. 17), for example. If yes, the program moves to step 2104 which sets trouble counter T equal to 1. The program then moves to step 2106 which asks whether T is greater than the number of defects or trouble . If no, the program moves to step 2108 which retrieves the zone number according to the fire protection zone scheme which includes the defective detector corresponding to T. The program then moves to step 2110 which asks whether the status of zone Z is normal, that is, whether zone Z currently has an assigned value of 0. If yes, the program moves to step 2112 to set zone Z equal to 1 which is indicative of a defective detector present in that zone.

If the answer in step 2110 is no or after step 2112, the program moves to step 2114 to increment T in order to perform steps 2108–2112 for the next defective detector.

When T is greater than the number of defective detectors, the answer in step 2106 is yes and the program moves to step 2116 which sets alarm counter A equal to 1.

The program then moves to step 2118 which asks whether the number of alarms is greater than 0. If no, the program exits ALARM ANALYSIS because there are no alarms to be analyzed. If yes, the program moves to step 2120 which asks whether the counter A is greater than the number of alarms. At least during the first pass through this portion of the subroutine, the answer to step 2120 will be no and the program moves to step 2122 which retrieves the zone number Z of the alarm corresponding to counter A. Step 2122 also retrieves the alarm type Y, that is, whether it is a detector or a manual pull station, and the "countdown" time CD defined in the system configuration for that zone and alarm type. The countdown time is used in a Halon release system to allow personnel to evacuate the building during the countdown before the Halon is released.

The program then moves to step 2124 which asks whether the retrieved alarm type is a manual pull station. If no, the program moves to step 2126 to increment A in order to analyze the next alarm.

If the answer in step 2124 is yes, the program moves to step 2128 which asks whether the retrieved zone Z equals to 4, that is, whether that zone is already in a Halon release condition. If yes, the program loops to step 2126. If no, the program moves to step 2130. Step 2130 sets the zone equal to 3 in order to initiate a predischarge status for zone Z which means that a Halon countdown condition exists for that zone. Step 2130 also starts the countdown as retrieved in step 2122.

The program then moves to step 2132 which asks whether the manual pull station is defined as a Type 2 station. If yes, which means that an abort switch can prevent Halon release, the program moves to step 2134 which asks whether the abort switch is active. If yes, the program loops to step 2126.

If the answer in step 2132 is no, the program moves to step 2134 which asks whether the manual pull station is a Type 4 station. If no, the program loops to step 2126. If yes, the program moves to step 2138 which sets zone equal to 4 for immediate Halon release by also setting the countdown at zero. The program also moves to step 2138 if the answer in step 2134 is no. After step 2138, the program loops to step 2126. Thus, activation of a Type 2 manual pull station will immediately release Halon if the abort switch is not active and a Type 4 manual pull station ignores the abort switch and immediately caues Halon release. The other types of manual pull stations initiate a Halon release countdown.

Figure 21B:
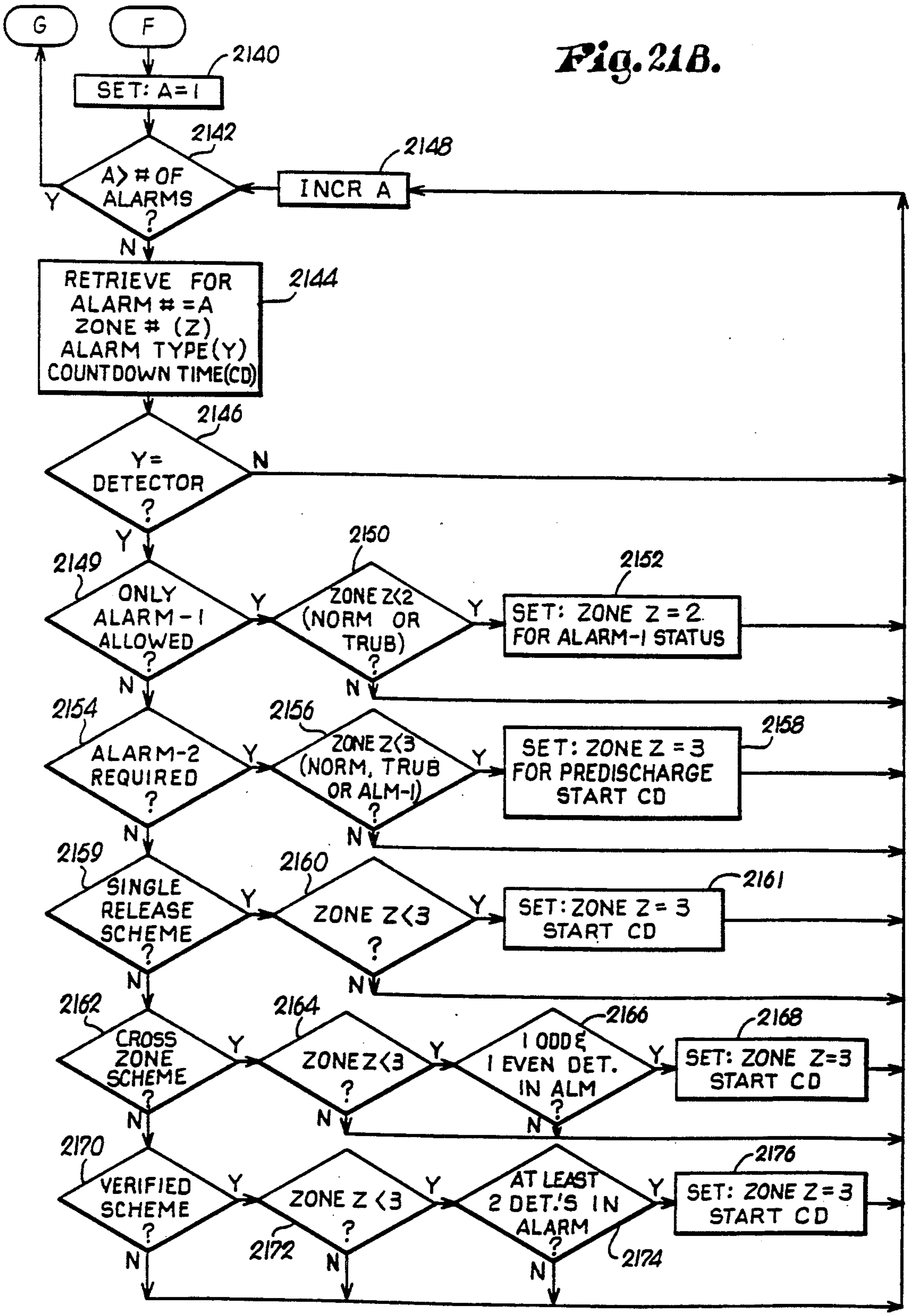
FIG. 21*b* is a computer program flowchart of the second part of the ALARM ANALYSIS subroutine.

After all of the alarms have been analyzed for manual pull stations, the answer in step 2120 is yes and the program moves to step 2140 (FIG. 21B). This portion of ALARM ANALYSIS determines whether a sufficient number of detectors are in an alarm condition to initiate a Halon release in accordance with the protection scheme. In step 2140, the program sets alarm counter A equal to 1 and moves to step 2142 which asks whether A is greater than the number of alarms. If no, the program moves to step 2144 which retrieves the alarm number corresponding to A, the zone number Z of alarm A, and the alarm type Y as well as the countdown time CD for zone Z.

The program then moves to step 2146 which asks whether alarm type Y is a detector. If no, which means that it is a manual pull station and has already been analyzed, the program loops to step 2148 to increment A in order to analyze the next alarm.

If the answer in step 2146 is no, the program moves to step 2149 which asks whether only an alarm type 1 condition is allowed for this detector in this zone. This means that this detector is not allowed to initiate Halon release. The system can be configured such that detector located in a restroom, for example, can only sound an audible alarm but cannot actuate Halon release. If the answer in step 2149 is yes, the program moves to step 2150 which asks whether zone Z is less than 2. In other words, whether zone Z has not yet been acutated for an alarm type 1 status. If yes, the program moves to step 2152 to set zone Z equal to 2 to there assign an alarm type 1 status to that zone. If no, the program loops to step 2148.

If the answer in step 2149 is no, the program moves to step 2154 which asks whether an alarm type 2 is required for that detector when in an alarm condition. In other words, the protection scheme may be arranged such that a single specified detector can initiate a Halon countdown. Thus, if the answer in step 2154 is yes, the program moves to step 2156 which asks whether zone Z is less than 3, that is, whether zone Z is already in an predischarge status. If no, the program loops to step 2148. If yes, the program moves to step 2158 which sets zone Z equal to 3 for an alarm type 2 status and starts the Halon countdown. The program then loops to step 2148.

If the answer in step 2154 is no, the program moves to step 2159 which asks whether the system is configured for a single release scheme which means that any one detector can initiate predischarge status. If yes, the program moves to step 2160 which asks whether zone Z is already in a predischarge status, that is, whether zone Z is less than 3. If yes, the program moves to step 2161 which sets zone Z equal to 3 in order to start the Halon release countdown and then loops to step 2148. If the answer in step 2160 is no, which means that zone Z is already assigned to a higher level status, the program also loops to step 2148.

If the answer in step 2159 is no, the program moves to step 2162 which asks whether zone Z is part of a cross zone scheme. If yes, the program moves to step 2164 which asks whether zone Z is less than 3. If yes, the program moves to step 2166 which asks whether at least one odd numbered and one even numbered detector is in alarm condition. That is to say, the odd numbered detectors in a cross zone scheme are defined as being in one zone and the even numbered detectors in another zone. If the answer in step 2166 is no, the program loops to step 2148. If yes, the program moves to step 2168 to set zone Z equal to 3 and to start the Halon countdown and then loop to step 2148.

If the answer in step 2162 is no, the program moves to step 2170 which asks whether zone Z is part of a verified scheme. If no, the program loops to step 2148. If yes, the program moves to 2172 which asks whether zone Z is less than 3. If no, the program loops to step 2148. If yes, the program moves to step 2174 which asks whether at least two detectors are in an alarm condition in zone A as required by the verified scheme. If no, the program loops to step 2148. If the answer in step 2174 is yes, the program moves to step 2176 to set zone Z equal to 3 for an alarm 2 status and to start the Halon countdown and then loops to step 2148.

Figure 21C:
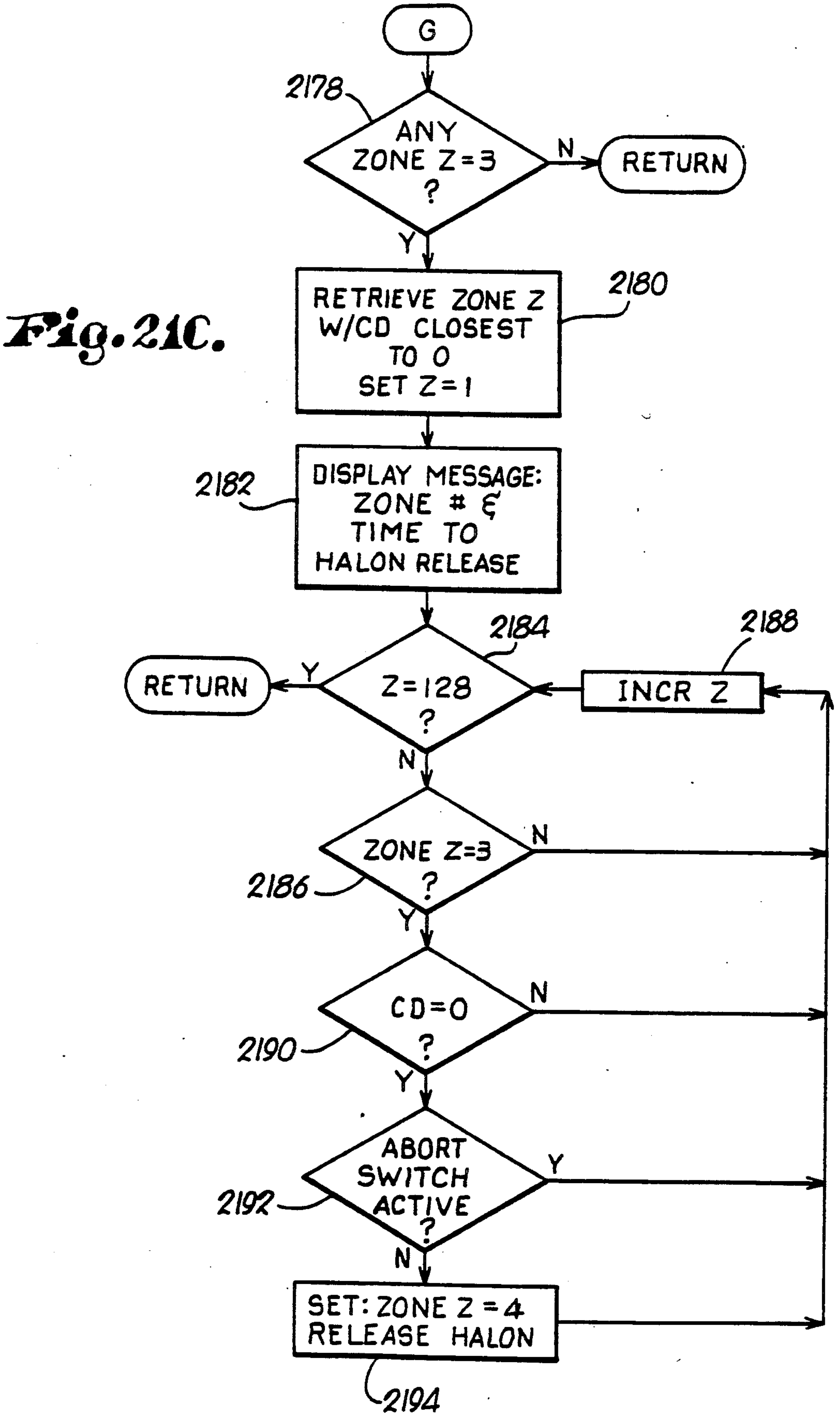
FIG. 21*c* is a computer program flowchart of the third part of the ALARM ANALYSIS subroutine.

The analysis as illustrated in steps 2142–2176 is conducted for each alarm condition. When complete, the answer in step 2142 is yes and the program moves to step 2178 (FIG. 21C). This step asks whether any zone equals 3, that is, whether any zone is in predischarge status as determined by the program portions of FIGS. 21A or 21B. If no, the program exits this subroutine. If yes, the program moves to step 2180 which retrieves the zone with the Halon countdown closest to 0 and sets the counter Z equal to 1.

The program then moves to step 2182 to display an appropriate message on LCD 1102 indicating the remaining countdown time to Halon release and the zone number in which the Halon is scheduled for release. The program then moves to step 2184 which asks whether counter Z equals 128. Until sufficient loops through this part of the subroutine, the answer is no, and the program moves to step 2186 which asks whether the zone corresponding to counter Z equals 3, that is, whether that zone is in predischarge status and thereby executing a countdown for Halon release. If no, the program loops to step 2188 to increment Z to analyze the next zone.

If the answer in step 2186 is yes, the program moves to step 2190 which asks whether the countdown as retrieved in step 2180 equals 0. If no, the program loops to step 2188. If yes, the program moves to step 2192 which asks whether the abort switch is active. If yes, the program loops to step 2198. If no, the program moves to step 2194 to set zone Z equal to 4 for an alarm type 3 status thereby initiating Halon release by producing an output to the Halon release device via the appropriate I/O module 500.

Determination of an active abort switch occurs by reading the appropriate input from I/O module 500. Note that when the abort switch becomes inactive, the program advances to step 2194 during a subsequent pass to release the Halon. Thus, in the preferred embodiment, an external abort switch must be held active until the system is reset.

As those skilled in the art will appreciate, the invention hereof encompasses many variations in the preferred embodiment described herein. For example, the functions performed by the operating program could be defined in hardware by means of a custom designed semiconductor chip incorporating hardward logic circuits equivalent to the logic functions performed by the software. This is not preferred because software allows changes to be made relatively easily as opposed to hardware which would require substitution of a new circuit even though only a small portion were changed.

The present invention also encompasses detectors other than the preferred detector which produces analog current signals to conveyor information. For example, detectors could be used which receive a specific multibit digital address for polling and which produce, in response, digitally encoded information rather than the analog currents herein preferred.

Additionally, while the preferred detector senses smoke obscuration, this system is readily adapted to other types of detectors which sense other environmental condition parameters such as ionization or temperature which are also indicative of a fire. Even further, the invention hereof encompasses detectors which might detect air pressure, nuclear radiation, infrared, and so forth which could be useful when the present invention is used to detect for an environmental status other than fire. For example, with a selected type of detector, the present invention can be useful in protecting a nuclear reactor or to provide building intruder security.

The present invention also encompasses signal processors such as logic circuits configured to perform the equivalent functions other than the preferred microprocessor.

Finally, the preferred embodiment is described herein in the context of a fire protection system for actuating release of a Halon fire suppressant gas. As those skilled in the art will appreciate, the control panel outputs can be used to actuate many types of external devices such as audible alarms, valves, fire protection doors, or even other computers.

Having thus described the preferred embodiment of the present invention, the following is claimed as new and desired to be secured by Letters Patent:

We claim:

1. An apparatus for detecting an environmental condition such as fire, smoke, and intrusion in a monitored space, said apparatus comprising:

a plurality of detectors each including means for sensing an environmental condition parameter in the monitored space and for producing detector signals representative of said parameter, each of said detectors individually exhibiting a normal operating current flow therethrough and exhibiting a selected increase in current flow therethrough as said detector signals;

signal processor means for receiving and processing said detector signals for determining the existence of predetermined environmental conditions; and connecting means for connecting said detectors with said signal processing means and with one another in an electrically parallel relationship, said connecting means including means for producing a detector voltage corresponding to the total current flow through said detectors including a quiescent voltage corresponding to the total quiescent current flow being the sum of said normal operating current flows through said detectors said signal processor means including detection circuit means for receiving and detecting said detector voltage, and null circuit means coupled with said connecting means for producing a voltage opposed in polarity and substantially equal in magnitude to said quiescent voltage for nullifying said quiescent voltage so that said detector voltage corresponds to said detector signals without the effect of said quiescent current thereon.

2. The apparatus as set forth in claim 1, said signal processing means including means for storing a quiescent value representative of quiescent voltage, said null circuit means including means responsive to quiescent value for altering said detector voltage in accordance therewith.

3. The apparatus as set forth in claim 2, said quiescent value including a digital value, said null circuit including a digital-to-analog converter responsive to said quiescent value for producing an analog voltage output in accordance therewith.

4. The apparatus as set forth in claim 3, said detection circuit means including means for producing a digital detection value representative of said detector voltage, said signal processing means being operable for storing said digital detection value as said quiescent value.

5. The apparatus as set forth in claim 4, said signal processing means including means for periodically updating said quiescent value by storing said detection value as said quiescent value at predetermined times.

6. The apparatus as set forth in claim 4, said signal processing means including means for performing successive iterations of said quiescent value in response to successive detection values until said quiescent voltage is substantially nullified.

7. The apparatus as set forth in claim 1, said selected increase in current flow producing a corresponding change in said detector voltage, said detection means including means for detecting said detection voltage change.

8. The apparatus as set forth in claim 1, said signal processing means including a microprocessor.

9. The apparatus as set forth in claim 1, said detectors being responsive to polling signals for producing said respective detector signals, said signal processing means including means for polling said detectors one at a time for producing detector voltages corresponding to respective detector signals.

* * * * *